US011763129B2

United States Patent
Cao et al.

(10) Patent No.: US 11,763,129 B2
(45) Date of Patent: Sep. 19, 2023

(54) SYSTEM AND METHOD FOR MACHINE LEARNING WITH LONG-RANGE DEPENDENCY

(71) Applicant: ROYAL BANK OF CANADA, Toronto (CA)

(72) Inventors: Yanshuai Cao, Toronto (CA); Peng Xu, Toronto (CA)

(73) Assignee: ROYAL BANK OF CANADA, Toronto (CA)

(*) Notice: Subject to any disclaimer, the term of this patent is extended or adjusted under 35 U.S.C. 154(b) by 526 days.

(21) Appl. No.: 16/809,267

(22) Filed: Mar. 4, 2020

(65) Prior Publication Data

US 2020/0285964 A1 Sep. 10, 2020

Related U.S. Application Data

(60) Provisional application No. 62/813,535, filed on Mar. 4, 2019.

(51) Int. Cl.
  *G06N 3/00* (2023.01)
  *G06N 3/006* (2023.01)
  *G06N 3/08* (2023.01)
  *G06N 20/20* (2019.01)
  *G06F 18/241* (2023.01)
  *G06N 3/045* (2023.01)

(52) U.S. Cl.
  CPC .......... *G06N 3/006* (2013.01); *G06F 18/241* (2023.01); *G06N 3/045* (2023.01); *G06N 3/08* (2013.01); *G06N 20/20* (2019.01)

(58) Field of Classification Search
  CPC ........ G06N 3/08; G06N 3/0454; G06N 20/20; G06N 3/0445; G06N 3/084; G06N 7/005; G06N 3/006; G06N 3/0472; G06N 3/088; G06K 9/6268; G06K 9/6271; G06K 9/6262; G06V 10/82
  See application file for complete search history.

(56) References Cited

U.S. PATENT DOCUMENTS 10,140,544 B1* 11/2018 Zhao ................. G06N 20/00
2019/0244609 A1* 8/2019 Olabiyi ................ G10L 15/26

OTHER PUBLICATIONS

Wikipedia, Kullback-Leibler divergence (Year: 2022).*
Wikipedia, Mutual information (Year: 2022).*
Belghazi et al, MINE: Mutual Information Neural Estimation, arXiv:1801.04062v1 (Year: 2018).*
Hjelm et al, Learning deep representations by mutual information estimation and maximization, arXiv:1808.06670v1 (Year: 2018).*
Norouzi et al, Reward Augmented Maximum Likelihood for Neural Structured Prediction, NIPS. (Year: 2016).*

* cited by examiner

*Primary Examiner* — Nancy Bitar
*Assistant Examiner* — Xiao Liu
(74) *Attorney, Agent, or Firm* — Norton Rose Fulbright Canada LLP

(57) ABSTRACT

A system, electronic device and method for improved neural network training are provided. The improved system is adapted for tracking long range dependence in sequential data during training, and includes bootstrapping a lower bound on the mutual information (MI) over groups of variables (segments or sentences) and subsequently applying the bound to encourage high MI.

20 Claims, 9 Drawing Sheets (a) PTB (b) WT2

SYSTEM AND METHOD FOR MACHINE LEARNING WITH LONG-RANGE DEPENDENCY

CROSS-REFERENCE

This application claims all benefit, including priority, to U.S. Application No. 62/813,535, filed Mar. 4, 2019, entitled "SYSTEM AND METHOD FOR MACHINE LEARNING WITH LONG-RANGE DEPENDENCY", incorporated herein by reference in its entirety.

FIELD

The described embodiments generally relate to the field of neural network training. More particularly, embodiments relate to the field of neural network training for autoregressive neural networks.

INTRODUCTION

Artificial neural networks are used for applications such as recognizing image and speech at levels comparable to humans. Neural networks can learn tasks and features by processing data, which is known as training. Once properly trained, neural networks can process data for a variety of applications, such as face recognition, speech processing, language translation, semiconductor fabrication, biomolecular analysis, and so on.

Training neural networks requires a significant amount of computing resources. For example, training deep neural networks is considered to be time consuming and computationally complex. Training of neural networks can use a large amount of processing resources. Training of neural networks can require large scale computational resources being run for days, or even months.

One example of a neural network is autoregressive neural networks. Autoregressive neural networks can be configured to process sequence data. Autoregressive neural networks may have difficulty in learning long-range dependency in sequential data. Training an autoregressive neural network can be computationally intensive, and may require a trade-off between accuracy and efficient and effective training.

Training autoregressive neural networks in a faster and more robust manner is desired to at least reduce computational complexity. Training an autoregressive neural network in a faster, more robust manner that provides increased accuracy when provided sequence data is desirable.

SUMMARY

Machine learning for sequence-based data is especially challenging from a technical perspective where there is some amount of long range dependence in the sequence data. For example, in a corpus of sequential data (e.g., textual data in an article), there can be relationships established between data elements that are not proximate to one another. In the textual data example, there can be statistical dependency over a short span (e.g., words in the same paragraph), but there can also be "long range" dependencies (e.g., words found at the beginning of an article that tie to a conclusion at the end of the article).

Long range dependence is difficult for neural networks to identify and train for as the relationships can be complex and require a larger number of samples to learn from as the number of possible sequences formed between distant data elements can be exponential (e.g., $K^m$). A sampling mismatch thus occurs for long-term dependencies as there will likely not be enough training examples for effective training using prior approaches (i.e., there is "sparsity" in the number of examples). This sampling mismatch results as there are not enough observations for modelling complex long-range dependency in prior approaches.

However, modelling and effective training for long range dependence is desirable in machine learning as these dependencies may be important for establishing accuracy of the trained model, and in some cases, may reduce an amount of computing time or processing resources required to achieve convergence.

Identifying long range dependence is useful, especially in relation to natural language processing (e.g., one word token follows the next, which together form sentences, paragraphs, sections, and entire articles) or other data sets where there is a notion of sequence (e.g., time-series data). For example, a trained machine learning model data architecture, trained in accordance with various embodiments described herein, can be stored on a non-transitory computer readable media and deployed for generating various classification output data structures.

A novel approach is proposed for incorporating into the usual maximum likelihood objective the additional prior that long-range dependency exists in texts. Approaches described herein achieve this by bootstrapping a lower bound on the mutual information (MI) over groups of variables (segments or sentences) and subsequently applying the bound to encourage high MI.

The first step of bootstrapping the lower bound can be a NSP task. Both the bootstrapping and application of the bound improves long-range dependency learning: first, the bootstrap step helps the neural network's hidden representation to recognize evidence for high mutual information that exists in the data distribution; and second, the information lower bound value as the reward encourages the model distribution to exhibit high mutual information as well. The proposed method is described experimentally herein for language modelling, although the framework/data architecture could apply to other problems as well.

The trained machine learning model data architecture can be trained to automatically generate a next sentence or a next word token, such as for use in generating word tokens for use in chatbots, automatic article generation, among others. The trained machine learning model data architecture can also be used to automatically generate readability scores by comparing what the trained machine learning model data architecture classifies as the next sentence or next word for a given stem and comparing with what is actually provided in a particular article.

The use for "next sentence prediction" (NSP) is only one example practical use case and there are other practical uses possible. Other uses, for example, can include automatic computer code generation, sequential pattern recognition (e.g., DNA sequences, amino acids/protein sequencing), itemset mining (e.g., Bayesian event probability modelling where one event is influenced by another, such as a car purchase leading to a purchase of floor mats).

Embodiments described herein explore a hidden connection of NSP to mutual information maximization, providing a more principled justification for those applications where NSP is used. Insights can use different neural network architectures (e.g., not limited to transformers), and it allows the design a new approach that shows additional improvements beyond NSP for RNN language modelling, in terms of improving long-range dependency learning.

As described in various embodiments, an improved machine learning approach is described that computationally establishes a mutual information estimation framework using a specific configuration of computational elements in machine learning that can be further extended to maximize the mutual information of sequence variables. The operating hypothesis is that longer segments in the data should have high r with each other; and a goal is for sequence variables under model Q to have similarly high $I^Q$.

The proposed approach not only is effective at increasing the mutual information of segments under the learned model but more importantly, leads to a higher likelihood on holdout data, and improved generation quality.

The approach, according to a first embodiment, includes applying a "bootstrapping method" to a mutual information regularizer. Ultimately, the approach is to use mutual information as a reward for the data model, however, the technical problem is that there is no estimator for mutual information available. In the two phased approach described in some embodiments, the first phase effective learns an estimator, and in the second phase, the estimator is re-used to encourage higher mutual information. The term bootstrapping refers to re-using the estimator (as opposed to the statistical definition of bootstrapping).

The mutual information regularizer is configured to track mutual information (e.g., how much does observing one random variable reveal about another (and vice versa)). The approach can be considered of comprising two phases, which may, in some embodiments, be implemented separately from one another and connected together. In another embodiment, both phases may be implemented together in the same computer system. Each phase can be implemented as separate subsystems of a computer, or be implemented using the same processor of a computer.

The first phase includes providing a computer system that is configured to bootstrap a MI lower bound by doing next sentence prediction, which is a binary classification of the correct next sentence versus a randomly sampled sentence. The first phase is adapted to cause the MI lower bound to be tight, which automatically forces the hidden representation of Q to preserve as much MI as possible and leads to the model Q to be better at recognizing related information. After Q and discriminator are sufficiently well trained, the learned parameters (θ, ω) can then be applied to MI under Q distribution, to get a lower bound $I_{\theta,\omega} \leq I^Q$.

After a switching condition is met, the second phase is conducted whereby the MI estimator is also used to produce reward for optimizing $I^Q$. In the second phase, where in addition to continue to optimize $I_{\theta,\omega}^{\mathbb{P}}$, the system can be configured to use $I_{\theta,\omega}^Q$ as reward to encourage high MI under Q. This has a more direct regularizing effect than $I_{\theta,\omega}^{\mathbb{P}}$.

This optimization, in some embodiments, can utilize an approach such as reward augmented maximum likelihood (RAML). Sequential sampling from Q is slow while deep RL converges slowly due to high variance, and accordingly, RAML was considered as an alternative. Because RAML does not directly support the MI bound as the reward, Applicants developed a modification via importance reweighting as described in various embodiments herein.

The machine learning data model architecture (model) is trained over a period of time by iterating through the training data sets. When new inputs are received by the trained machine learning data architecture, it can be used to generate output data structures that can include data values corresponding to logits that can be used, for example, with a softmax to arrive at classifications (e.g., the highest logit).

These output data structures can be used to determine, for example, what the model computationally estimates to be the next sentence, character, word token, etc., which can then be used in various applications, such as automatic generation of sequential data corpuses (e.g., making computer generated text/computer generated SQL queries), comparing the logits to existing data (e.g., computer estimated or human) to compare outputs between models.

For example, the trained machine learning data architecture can also be used for translations between languages, or between different types of syntax/schemas. In a non-limiting example, in an aspect, the system is utilized for conversion between natural-language based queries and query language syntax (e.g., a domain-specific language such as SQL that can be used with relational databases). The capturing of long range dependencies is particularly useful in this situation as there may be relationships hidden in very long queries as the logic embedded in the queries can be nested at various levels based on the syntactical relationship between tokens in the query. For example, in a Microsoft Excel™ formula, due to the syntactical requirements, nested IF statements may have sections that are sequentially distant relative to character sequences, but actually exhibit a very high degree of mutual information.

Model output comparison can be used, for example, to automatically generate readability scores or to estimate errors in externally provided human or computer generated outputs. As an example, human written articles can be automatically assigned a readability score, or human written translations of natural language queries into SQL queries can have estimated errors detected. In a further embodiment, a computer implemented interface may be rendered based on the estimations to show graphically sections of low readability scores or estimated errors.

The approaches described herein are experimentally validated to demonstrate improved perplexity and reverse perplexity metrics on two established benchmarks (corpuses of textual data from the Penn Treebank project (financial news articles) and Wikipedia), reflecting the positive regularizing effect. The experimentation also shows that an embodiment of the proposed method can help the model generate higher-quality samples with more diversity measured by reversed perplexity and more dependency measured by an empirical lower bound of mutual information.

In an embodiment, a computer implemented system for training a neural network representing data model Q is provided. The system includes a computer processor operating in conjunction with computer memory and a data storage maintaining one or more interconnected computing nodes having adaptive interconnections which represent the neural network. The computer processor is configured to initialize the neural network by providing a discriminator neural network parametrized by θ on top of the data model Q's hidden features parametrized by ω (e.g., parameter of a base model, such as seq2seq), the discriminator neural network observing pairs of segments or sequence in an input data set.

In a first phase of training, the computer processor conducts (e.g., bootstraps) a next token (e.g., sentence) prediction training process of the data model Q adapted for learning to classify a correct next token from a randomly sampled token, the next token prediction training process continuing until a switching condition is satisfied. A switching condition is established to provide a switching point to the next phase.

This switching condition can be established to determine, for example, that the training is no longer making sufficient progress (e.g., showing that the learning has plateaued such that accuracy is no longer improving at a sufficiently good rate). Progress can be empirically measured or monitored through tracking the loss function (e.g., exponential smoothing of the loss function can be tracked over both a short period and a long period, and if the short period does not show improvement over the long period, the switching condition can be met). Other switching conditions are possible.

When the switching condition is met, parameters θ,ω are learned (e.g., extracted) from the discriminator neural network, and a lower bound of mutual information between sampled elements in the series of elements $I^\mathbb{P}$ can be determined. From this lower lower bound of mutual information between sampled elements in the series of elements $I^\mathbb{P}$, the processor then establishes a lower bound of mutual information $I_{\theta,\omega}^Q$ in the model Q based on the parameters θ,ω.

The processor conducts a second phase of training to train the neural network to continue to optimize $I_{\theta,\omega}^\mathbb{P}$ (parameterized lower bound for mutual information under data distribution) and to use the one or more mutual information parameters of the neural network $I_{\theta,\omega}^Q$ (parameterized lower bound for mutual information under model distribution) as a reward to encourage high mutual information in the data model Q such that the mutual information in the model Q between two random variables X and Y, $I^Q(X,Y)$, is directly optimized to update (e.g., iteratively update) the adaptive interconnections of the one or more interconnected computing nodes of the neural network. The adaptive interconnections can be represented, for example, in dynamically updated data objects storing the interconnections and weights/filters thereof as data values.

The trained neural network can then be deployed for various uses, and in some embodiments, it can be stored or affixed on non-transitory computer readable media storing machine interpretable instructions so that the trained neural network can be deployed through generating copies or communicating data structures to downstream devices. Deployment can include processing new inputs through the trained neural network such that the trained neural network generates output data structures corresponding, for example, to classification logits, a predicted next token (e.g., next sentence), among others.

In some embodiments, the mutual information I(X; Y) between two random variables X and Y is defined as a Kullback-Leibler (KL) divergence between a joint $\mathbb{P}_{XY}$ and a product of marginal distributions $\mathbb{P}_X \otimes \mathbb{P}_Y$ of two random variables established by the relation: $I(X:Y) = KL(\mathbb{P}_{XY} \| \mathbb{P}_X \otimes \mathbb{P}_Y)$.

In some embodiments, the mutual information I(X;Y) between two random variables X and Y is defined as the difference between entropy and conditional entropy: $I(X;Y)=H(Y)-H(Y|X)=H(X)-H(X|Y)$.

In some embodiments, $I^\mathbb{P}$ is optimized using a MINE lower bound in accordance with a relation: $I^\mathbb{P}(X;Y) \geq I_\zeta^\mathbb{P}(X,Y): I_\zeta^\mathbb{P}(X,Y) = E_{\mathbb{P}_{XY}}(T_\zeta(X,Y)) - \log E_{\mathbb{P}_X \otimes \mathbb{P}_Y}(e^{T_\zeta(X,Y)})$; wherein $T_\zeta(X,Y)$ is a parametrized test function adapted to distinguish samples of a joint distribution from those from a product of marginals.

In some embodiments, the processor is configured to compose an intermediary hidden layer representation $\phi_\omega(\bullet)$ of the neural network with a discriminator $D_\theta : \Phi \rightarrow \mathbb{R}$; and the parametrized test function is provided in accordance with $T_\zeta(X,Y) = T_{\theta,\omega}(X,Y) : T_{\theta,\omega}(X,Y) = D_\theta(\phi_\omega(x), \phi_\omega(Y))$.

In some embodiments, the relation $I^\mathbb{P}(X;Y) \geq I_\zeta^\mathbb{P}(X,Y): I_\zeta^\mathbb{P}(X,Y) = E_{\mathbb{P}_{XY}}(T((X,Y)) - \log E_{\mathbb{P}_X \otimes \mathbb{P}_Y}(e^{T_\zeta(X,Y)})$ is optimized using noise contrastive estimation to turning convert the relation into a binary classification problem.

In some embodiments, the one or more mutual information parameters of the neural network $I_{\theta,\omega}^Q$, are directly optimized using a reward augmented maximum likelihood approach (RAML) whereby a reverse direction of KL divergence is optimized compared to an entropy-regularized policy gradient RL objective.

In some embodiments, the reward augmented maximum likelihood approach includes utilizes an importance sampling approach whereby a geometric distribution based at the index of Y* as a proposal distribution is used, where Y* is a token following X in a corpus of data. The importance sampling approach is useful as it is technically difficult to directly utilize RAML and simplistic reward approaches, such as edit distance, etc., do not work well in this application of RAML. Accordingly, the importance sampling approach allows for indirect application of RAML.

In some embodiments, the trained neural network is utilized to receive new input data sets and to generate output data sets by processing the new input data sets through the adaptive interconnections of the one or more interconnected computing nodes of the neural network.

In some embodiments, the new input data sets and the output data sets each include at least one of natural language text strings and structured query language text tokens.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
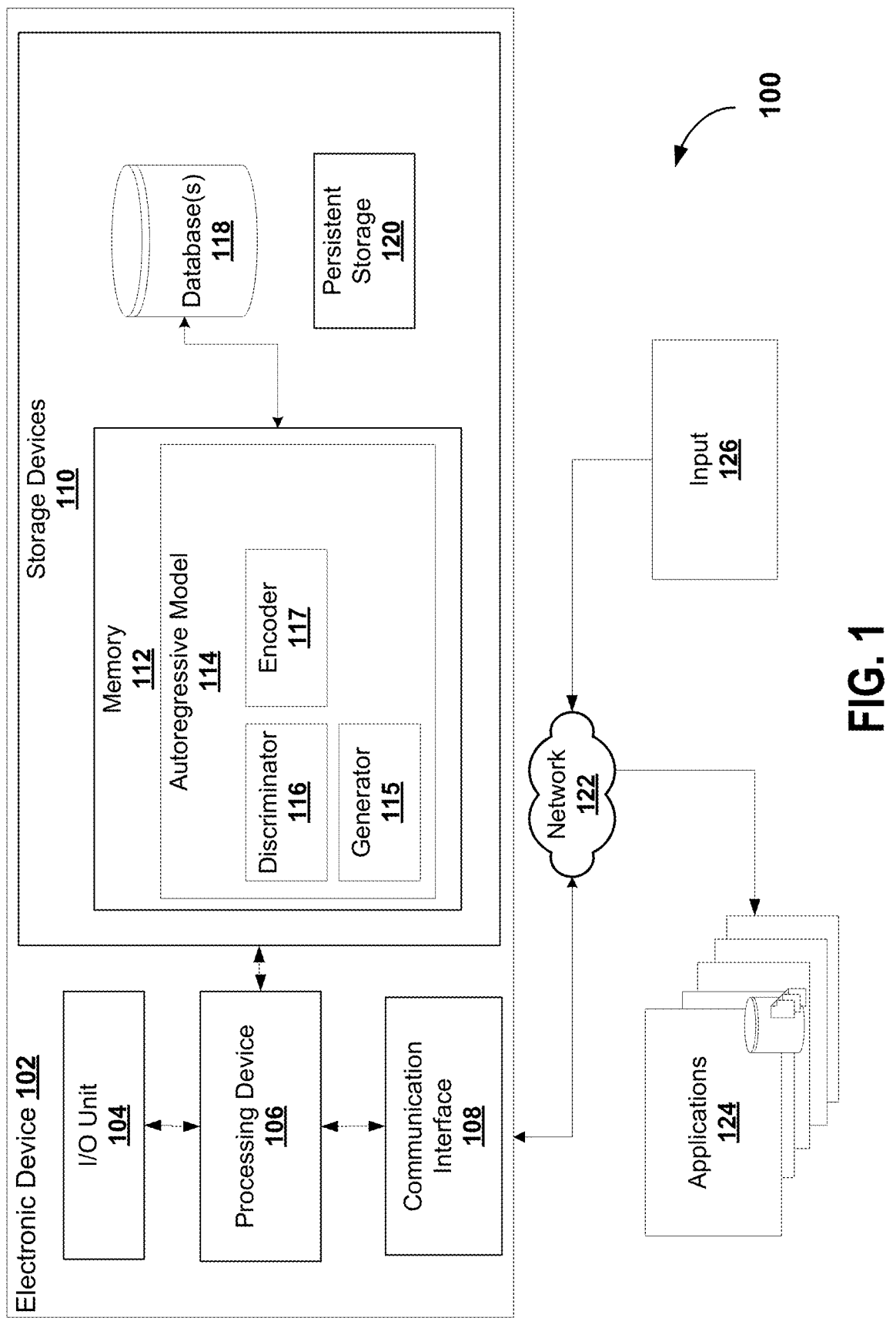
FIG. 1 is an example schematic diagram of an electronic, in accordance with an example embodiment.

Processing sequential data with neural network architectures can be computationally complex Learning long-range dependency in sequential data is challenging to capture using neural network architectures.

The difficulty has mostly been attributed to the vanishing gradient problem in autoregressive neural networks such as recurrent neural networks (RNN). Other approaches attempting to solve this gradient flow problem have focused on creating better architecture, a better optimizer or arranging for better initialization. However, the vanishing gradient problem may not be the only limitation preventing faster, more robust, and more accurate or effective training on sequential data.

It is proposed that sparse sampling of high order statistical relations within sequential data is also a factor which causes learning long range dependency to be hard to capture in neural network architectures. There is a lack of exploration of long-range dependency within sequential data, which typically involves more complex or abstract relationships between a large number of sequential elements (high order interactions).

While statistical dependency between sequential data elements over the short span is usually abundant in sequential data, high order statistical relations are less likely to be present. High order interactions may inherently require a greater number of samples to learn from because of the greater number of factors involved, although compositionality could alleviate the increased sample complexity. A sampling mismatch between observations supporting short term correlations (alternatively referred to as local correlations) and observations for high order interaction may be present in configuring neural network architectures.

By way of example, language modelling with a vocabulary of size K, the number of possible sequences grows as $K^m$, where m is the sequence length. Neural language models use distributed representation to overcome this curse of dimensionality, as not all $K^m$ sequence forms plausible natural language utterance, and there is shared semantics and compositionality in different texts.

However, the parametrization does not change the fact that in the training data there is an abundance of observation for local patterns such as common bigrams, phrases, idioms, but much sparser observation for the different high-level relationships. Indeed, a sufficiently large corpus could potentially cover almost all plausible bigrams, but never all possible thoughts. As language evolved to express the endless possibilities of the world, even among the set of "plausible" long sequences, a training set can only cover a small fraction.

Therefore, there is an inherent imbalance of sampling between short range and long range dependencies. As such, because it is a data sparsity issue at the core, it cannot be solved entirely by better architecture or optimization.

As described in some approaches herein, there is proposed a generator neural network architecture which incorporates one or more mutual information (MI) parameters, learned by a discriminator network used to determine a lower bound of mutual information within a distribution of a series of elements, into a regularizing term within a generator gradient.

The one or more mutual information parameters, which when used by the discriminator network to determine a lower bound of mutual information within the distribution of the series of elements, pushes for the capture of as much data mutual information (MI) as possible. The one or more mutual information parameters used in the generator optimize a distribution of the generator which promotes the generator to generate sequence elements which have high mutual information. The usual maximum likelihood objective and the additional prior knowledge that that long-range dependency exists in texts is incorporated to train a generator.

A lower bound on the MI is bootstrapped over groups of variables (i.e., segments or sentences). The bound is subsequently applied to encourage a discriminator to find high MI.

Both the bootstrapping and the application of the MI lower bound improves long-range dependency learning: first, the bootstrap step helps the neural network's hidden representation to recognize evidence for high mutual information that exists in the data distribution, and second, the information lower bound value as the reward encourages the generator distribution to exhibit high mutual information as well.

The latter may be implemented in accordance with policy gradient reinforcement learning (RL), or in example embodiments an efficient alternative based on a modified version of Reward Augmented Maximum Likelihood (RAML) may be used.

As a non-limiting example use case, the generator neural network may be a network trained to generate natural language queries in response to receiving a series of elements which are structured query language (SQL) queries. For example, where a user seeks, via an input, a particular data set stored within an SQL operated database (i.e. "Please provide me with all employee expense reports for the last month submitted by high billing employees"), the generator may be trained to, in response to processing the input, a SQL compliant command responsive to the input.

According to some embodiments, for example, the generator neural network may be trained to generate text in response to receiving text input. For example, the generator neural network may be used in a chatbot, to provide more long term dependency aware responses. As a result of improved long term dependence modelling in an improved machine learning data model architecture, the generator neural network which incorporates one or more mutual information parameters may be trained in a faster and more robust manner, leading to reduced computational complexity and increased efficiency in allocating computing resources during training of the generator neural network.

The generator neural network which incorporates one or more mutual information parameters is configured to better allocate a discriminator's capacity and computing resources, and therefore the generator neural network may lead to a greater learning rate of when paired with a discriminator neural network.

Most other approaches focus on the gradient flow in backpropagation through time (BPTT). The LSTM architecture was invented to address the very problem of vanishing and exploding gradient in recurrent neural networks (RNN). There is literature on improving the gradient flow with new architectural modification or regularization. Seq-to-seq models with attention or memory is a major neural architecture advance that improves the gradient flow by shortening the path that relevant information needs to traverse in the neural computation graph. The recent innovation of the transformer architecture, and the subsequent large scaling pre-training successes are further examples of better architecture improving gradient flow.

There are also other approaches that use auxiliary prediction tasks such as regularization for sequence or seq-to-seq models. The focus in these other approaches still on vanishing/exploding gradient and issues caused by BPTT. Such methods are justified empirically and it is unclear if the auxiliary task losses are compatible with maximum likelihood objective of language modelling, which was not explored in approaches using auxiliary prediction tasks as regularization.

Some methods add a "next sentence prediction" task to the masked language model objective, which tries to classify if a sentence is the correct next one or randomly sampled.

This task is similar to the classification in a discriminator for learning the lower bound $I_{\theta,\omega}^{\mathbb{P}}$, but prior sentence prediction approaches are unaware of the theoretical connection to mutual information, or explaining its regularization effect on the model.

Applying the bootstrapped one or more parameters in a generator for more direct regularization is not present in next sentence prediction" task approaches.

Finally, the "next sentence prediction" task in BERT is done from the feature corresponding to a special token "[CLS]", rather than from all inputs' features, which has a weaker MI regularization effect.

Some works feed an additional representation of the long range context into the network including additional block, document or corpus level topic or discourse information. Utilizing a generator trained in accordance with the example embodiments described herein is orthogonal to these works.

In example embodiments, a generator trained in accordance with the methods set out herein can be used for speech recognition. In text or speech applications, bigrams, common phrases and idioms are sequential elements exhibiting statistical dependency over the short span.

A generator neural network trained based on one or more mutual information parameters can be very useful when implemented as a speech recognition application. For example, de-noising is an important aspect of speech recognition applications. An autoregressive neural network comprising a generator may be trained to de-noise an audio clip during speech recognition. In some embodiments, autoregressive neural networks comprising generators may be implemented to recognize or predict a next element in an audio clip or a text file.

In some embodiments, neural networks that are used to recognize mutual information within a series of linguistic elements can be utilized, and accordingly, the Applicants' disclosure in U.S. patent application Ser. No. 16/669,741 (entitled SYSTEM AND METHOD FOR CROSS-DOMAIN TRANSFERABLE NEURAL COHERENCE MODEL and filed Oct. 31, 2019, is incorporated in its entirety herein by reference.

FIG. 1 shows an example schematic of an electronic device 100 implementing an example autoregressive model 114. In example embodiments, the autoregressive model 114 may include a classifier (alternatively referred to as a discriminator) 116, a generative neural network (alternatively referred to as a generator) 115, and an encoder neural network (referred to alternatively as an encoder) 117.

These elements are implemented as one or more computing devices that provide one or more computer systems. An example computer system could include a computer server having a physical computer processor operating in conjunction with computer memory and data storage. The computer system can be implemented using field programmable gate arrays (FPGAs), microprocessors, reduced instruction set processors, among others, and can include corresponding computer circuits and computing components.

The neural networks and trained neural networks can also be stored as representations of one or more interconnected computing nodes having adaptive interconnections as data objects in non-transitory computer readable media. The training mechanism of various embodiments can be implemented as machine-interpretable instructions stored on non-transitory computer readable media, which when executed by a processor, cause the processor to execute methods described in various embodiments herein.

The autoregressive model 114 may be configured to processes a series of elements which are time variant or sequence dependent. In example embodiments, the autoregressive model 114 generates a predicted element (alternatively referred to as a subsequent element) which is based linearly on previous elements (alternatively referred to as preceding elements) of a series of elements and on a stochastic term (an imperfectly predictable term).

A processing device 106 can execute instructions in memory 112 to initialize, train, or digest or pass information through the autoregressive model 114, the generator 115, and the discriminator 116. For example, in some embodiments, the processing device 106 can execute instructions in memory 112 to configure the classifier 116 during a training or refining phase. A processing device 106 can be, for example, a microprocessor or microcontroller, a digital signal processing (DSP) processor, an integrated circuit, a field programmable gate array (FPGA), a reconfigurable processor, or various combinations thereof.

Discriminator 116 can be a neural network (parametrized by ω) that is added on top of the base model Q's hidden features (parametrized by w). The discriminator 116 will then process pairs of segments or sequence, the S's in FIG. 3, trying to distinguish pairs following some joint distribution (as with dependency) versus product of marginals (independent S's). The discriminator 116 serves the MI regularization in both phases.

Making the MI lower bound tight automatically forces the hidden representation of Q to preserve as much MI as possible, making the model Q good at recognizing related information. After Q and discriminator are sufficiently well trained, the learned parameters (θ, ω) can then be applied to MI under Q distribution, to get a lower bound $I_{\theta,\omega}^Q \leq I^Q$. This leads to the second phase, where in addition to continue to optimize $I_{\theta,\omega}^{\mathbb{P}}$. Applicants use $I_{\theta,\omega}^Q$ as reward to encourage high MI under Q. This has a more direct regularizing effect than $I_{\theta,\omega}^{\mathbb{P}}$.

Directly optimizing $I_{\theta,\omega}^Q$ requires sampling from Q and learning by policy gradient (or other gradient estimators). However, sequential sampling from Q is slow while deep RL converges slowly due to high variance. Hence, Applicants explore an alternative, the reward augmented maximum likelihood (RAML), in some embodiments.

The autoregressive model 114 can be used for applications 124, such as speech recognition applications, based on input 126, such as an audio input.

Autoregressive model 114 may be, in some embodiments, executed by the processing device 106 to generate text output for speech recognition applications 124 based on input 126 over a network 122. For example, audio input 126 may read "good morning world" with some audible noise. The electronic device 100 implementing the autoregressive model 114 may generate, based on its neural network layers trained with classifier 116, a text file "good morning world", without being effected by the noise in the audio clip.

In example embodiments, the autoregressive model 114 can be used for in accordance with SQL applications 124 based on natural language input 126. For example, the autoregressive model 114 may be able to convert natural language queries into SQL complaint queries capable of interacting with SQL applications 124. In example embodiments, the autoregressive model 114 is configured to convert SQL complaint queries into natural language queries.

In some embodiments, once the autoregressive model 114 is properly trained, the discriminator 116, and encoder 117 are no longer required for the generator 115 to perform. In these cases, the discriminator 116, and encoder 117 may be turned off. In example embodiments, once the autoregressive model 114 is properly trained, a first data set representing the generator 115 may be stored in memory.

In example embodiments, autoregressive model 114 is intended to be implemented on systems having some or all elements of an existing autoregressive model 114. For example, the autoregressive model 114 may configured to implement the generator 115 upon receiving information representing processed elements from an existing discriminator. In example embodiments where the autoregressive model 114 is used to retrofit existing systems, the autoregressive model 114 may be configured to receive information from the existing model or model elements further processes the received information through the generator 115. In some embodiments, autoregressive model 114 may be implemented as digital circuits, analog circuits, or integrated circuits. For example, autoregressive model 114 may be implemented through field-programmable gate arrays (FPGAs). Training or executing autoregressive model 114 with a vast amount of data would typically require a significant amount of computing power due to the complexity of autoregressive model 114 and the amount of input data required.

In example embodiments, various components of the electronic device 100 are stored on separate devices (e.g., electronic device 100 can operate as a mutual information accuracy improvement device for increasing detection of, and generation of long range dependency aware sequence estimators). For example, where the electronic device 100 is used for a retrofit to improve accuracy of an existing system, the various components of the autoregressive model 114 may be stored on separate servers in accordance with computing resource availability.

Storage devices 110 may be configured to store information associated with the generator 115, such as instructions, rules associated with the discriminator 116. Storage devices 110 and/or persistent storage 120 may be provided using various types of storage technologies, such as solid state drives, hard disk drives, flash memory, and may be stored in various formats, such as relational databases, non-relational databases, flat files, spreadsheets, extended markup files, etc.

Memory 112 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM), among others. Storage devices 110 include memory 112, databases 118, and persistent storage 120.

Each I/O unit 104 enables the electronic device 100 to interconnect with one or more input devices, such as a keyboard, mouse, camera, touch screen and a microphone, or with one or more output devices such as a display screen and a speaker.

Each communication interface 108 enables the electronic device 100, and programs stored thereon such as the generator 115, to communicate with other components over network 122, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, and various combinations thereof.

According to some embodiments, for example, the encoder 117 may process a series of elements in order to extract a plurality of first and second features.

According to some embodiments, for example, the discriminator 116 may be configured to determine whether the first and second features from the series of elements, or any feature pair, contain MI.

According to some embodiments, for example, the generator 115 may be trained to generate a predicted or subsequent element, and training the generator 115 is based on the discriminator 116 processing the features.

In example embodiments, the generator 115 is based at least partially on a maximum likelihood language model.

A language model (LM) assigns probability to a sequence of tokens (characters, bytes, or words). Using $\tau$'s to denote sequence token variables, a language model Q, alternatively referred to as the generator 115 model) typically factorizes the joint distribution of $\tau_i$'s by a product of conditionals from left to right, leveraging the inherent order in texts:

$$Q(\tau_1, \ldots, \tau_k) = \prod_{i=1}^{k} Q(\tau_i \mid \tau < i) \quad (1)$$

where $\tau<i$ denotes all token variable with index less than i, and $Q(\tau_1 \mid \tau_{<1}) = Q(\tau_1)$.

Let $(t_i)_{i=1}^n$ be an observed sequence of tokens as training data, sampled from data distribution (alternatively referred to as a series of elements 202) $\mathbb{P}$, learning simply maximizes the log likelihood of the observations with respect to the parameters w of the generator 115 model Q (the notation Q and $Q_\omega$ interchangeably):

$$L_{MLE}(\omega) = \sum_{i=1}^{n} \log Q_\omega(\tau_i = t_i \mid t_{<i}) \quad (2)$$

As $L_{MLE}$, the log loss of the LM, requires the generator 115 model Q to focus its probability mass on observed subsequent tokens given its preceding ones, maximum likelihood learning does have the ability to enforce long range dependencies of sequence variables. However, problems arise when only a small fraction of valid outcomes are observed. To see this, take a partition the sequence variables $(T_i)_{i=1}^n$ into $[T_{<a}, X, Y]$, where $X = (\tau_a, \ldots, \tau_b)$ and $Y = (\tau_{b+1}, \ldots, \tau_n)$. Then Eq. 2 can be equivalently written as:

$$L_{MLE}(\omega) = \sum_{i=1}^{b} \log Q_\omega(\tau_i = t_i \mid t_{<i}) + \\ \log Q_\omega(Y = (t_{b+1}, \ldots, t_n) \mid X = (t_a, \ldots, t_b), t_{<a}) \quad (3)$$

Eq. 3 is exactly equivalent to Eq. 2, but it reveals that when the observation of the high order interaction between variables in X and Y is sparse, MLE enforces dependency by requiring the generator 115 model Q to commit its prediction to the particular observed sequence(s). Expressing the prior knowledge that there is some dependency between X and Y without committing to particular predictions is desirable.

Figure 2:
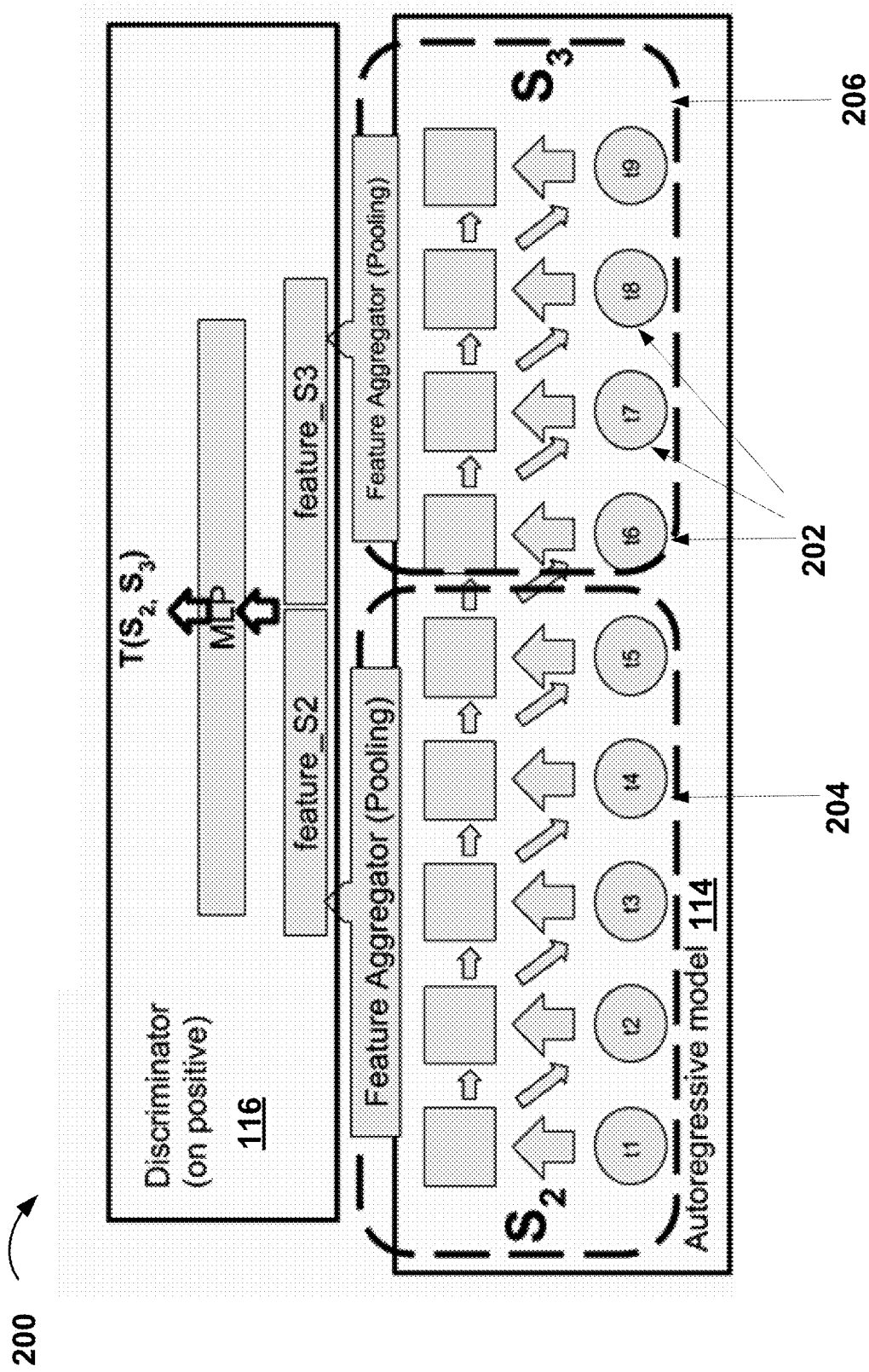
FIG. 2 is an example schematic diagram of an autoregressive neural network processing a series of elements, in accordance with an example embodiment.

FIG. 2 illustrates is an example schematic diagram 200 of an autoregressive neural network 114 processing a series of elements.

In the example embodiment shown, the autoregressive model 114, via the encoder 117, processes a series of elements 202 (e.g., the shown $t_1, t_2, t_3 \ldots t_9$). The series of elements 202 in example embodiments is sequential text, such as a paragraph, article, and so forth. According to some embodiments, for example, the series of elements 202 is any sequential data.

The autoregressive model 114, via the encoder 117, may processes or partially processes the series of elements 202 and iteratively generate a first feature 204 and a second feature 206. The first feature 204 and the second feature 206 may represent a linear combination of the respective series of elements 202. In example embodiments, the encoder 117, may process the series of elements 202 according to any linear combination algorithm which preserves existing sequential relationships within the series of elements 202 when extracting features.

In example embodiments, the series of elements 202 is partitioned into batches and a plurality of first features 204 and second features 206 are iteratively sampled from the partition. For example, each partition of the series of elements 202 may be randomly sampled, or in example embodiments the series of elements 202 may be randomly or selectively portioned into various groups (i.e., a partition may only include consecutive elements).

The first feature 204 and second feature 204 may be passed through the discriminator (alternatively referred to as a classifier) 116. The discriminator 116 may be trained/configured to discriminate between pairs of features which exhibit a set of criteria. In example embodiments, the discriminator 116 is configured with one or more mutual information parameters, and the discriminator 116 discriminates between feature pairs which contain MI and feature pairs which do not.

For example, the discriminator 116 may be trained to such that that two consecutive features are likely to contain mutual information, whereas two non-consecutive features are unlikely to contain mutual information. In example embodiments, the discriminator 116 is trained with samples from the series of elements, the samples partitioned such that two consecutive features are set to contain mutual information, whereas two non-consecutive features are set to not contain mutual information.

The discriminator 116 may be implemented using software or hardware, such as program code stored in non-transitory computer readable medium. The program code can be stored in memory 112 and can be executable by a processor.

Mutual information is a measure of how much one random variable informs about another (and vice versa), and is zero if and only if the two random variables are independent of one another.

The mutual information I(X:Y) between two random variables X and Y (scalars or vectors) can be expressed by the Kullback-Leibler divergence between the joint distributions $\mathbb{P}_{XY}$ and product of marginal distributions $\mathbb{P}_X \otimes \mathbb{P}_Y$ of the two random variables, as is shown below in Eq. 4:

$$I(X:Y) = KL(\mathbb{P}_{XY} \| \mathbb{P}_X \otimes \mathbb{P}_Y) \tag{4}$$

MI is defined with respect to the distribution of the sequence variables, rather than the particular observed values, MI provide a means of capturing the interdependency between two random variable X and Y without forcing the generator 115 model Q to commit to the particular prediction.

The MI between two random variables, I(X; Y), can also be expressed as the difference between entropy and conditional entropy:

$$I(X; Y) = H(Y) - H(Y | X) \tag{5}$$

$$H(X) - H(X | Y) \tag{6}$$

When MI is represented in this manner, high amounts of mutual information discovery can be achieved by minimizing conditional entropy or maximizing marginal entropy (or both).

Unlike maximum likelihood estimation (MLE), which can only maximize MI by reducing the conditional entropy, a MI regularizer (alternatively referred to as a discriminator 116 regularizer term) may have the option of encouraging long-range dependency without forcing the generator 115 model Q to commit its prediction to observed sequence(s), but by increasing the marginal entropy H(Y).

The definitions in Eq. 4 and Eq. 5-6 depend on the distribution used to represent the random variables and where different models use different probabilities, the determination of MI may vary.

For example, the distribution used to predict the amount of MI within the series of elements, represented by $\mathbb{P}$, may be different that the distribution utilized by the generator 115 model Q to determine subsequent elements, and the discovery and determination of MI between the two models may not the same. Hereinafter, the mutual information within the series of elements 202 will be referred to as $I^{\mathbb{P}}$, and the mutual information predicted by the generator 115 model Q will be referred to as $I^Q$.

As $I^{\mathbb{P}}$ may not be able to directly computed, because even a Monte Carlo estimate requires evaluating log $\mathbb{P}$, it may be lower bounded.

In example embodiments, a mutual information neural estimation (MINE) lower bound, $I^{\mathbb{P}}(X,Y) \geq I^{\mathbb{P}}_\zeta(X,Y)$ can be incorporated into the discriminator 116, with a function $T_\zeta(X,Y)$. The function may be a parametrized test function, having one or more mutual information parameters that tries to distinguish a plurality of the series of elements into categories of a joint distribution, where features have mutual information with one another, and a product of marginals, where features do not contain mutual information.

The test function $T_\zeta(X,Y)$ can be any function and optimizing the one or more mutual information parameters $\zeta$ makes the bound tighter. According to some embodiments, for example, the test function $T_\zeta$ is configured to share one or more mutual information parameters with the generator 115 model Q.

According to some embodiments, for example, $\phi_\omega(\bullet)$ represents elements of the series of elements 202 processed by the encoder 117, alternatively referred to as features, and denotes some intermediary hidden layer representation of the generator 115 model Q$\omega$, Feature pairs may be represented as (X,Y) pairs.

The discriminator 116 may comprise a discriminator 116 function, represented by $D_\theta: \Phi \rightarrow \mathbb{R}$. The discriminator 116 function may be trained to processes features $\phi_\omega(\bullet)$ to form the test function $T_\zeta(X,Y) = T_{\theta,\omega}(X,Y)$ having one or more mutual information parameters $(\theta, \omega)$:

$$T_{\theta,\omega}(X,Y) = D_\theta(\phi_\omega(X), \phi_\omega(Y)) \tag{7}$$

which yields the lower bound $I^{\mathbb{P}} \geq I^{\mathbb{P}}_{\theta,\omega}$.

For brevity, Applicants will write $\phi_\omega^X = \phi_\omega(X)$ and $\phi_\omega^Y = \phi_\omega(Y)$ henceforth. X and Y of $\mathbb{P}_{XY}$ can be consecutive pair of sentences. Other pairs could also be regularized in theory, such as consecutive segments, or pairs of sentences at special positions in a document, like the first sentence of consecutive paragraphs.

Figure 3:
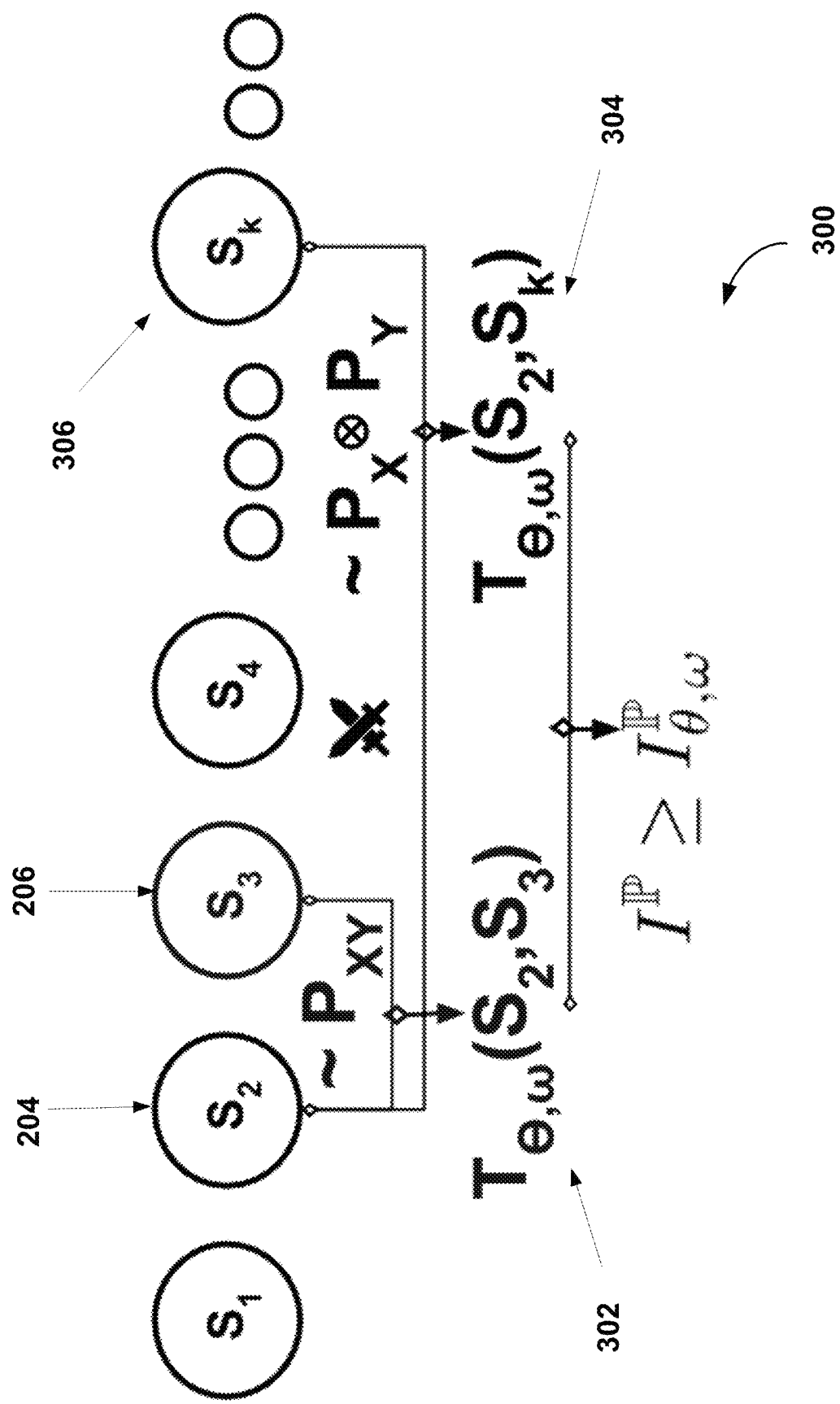
FIG. 3 is an illustration showing a number of features being processed by a discriminator, in accordance with an example embodiment.

Eq. 4 can be optimized using noise contrastive estimation, by turning it into a binary classification problem. To sample positive examples from $\mathbb{P}_{XY}$, Applicants draw $X=S_l$ for some sentence indexed 1 and $Y=S_{l+1}$, $(X,Y)=(S_l, S_{l+1})$. To sample negatives from the product of marginals $\mathbb{P}_X \otimes \mathbb{P}_Y$, Applicants take $X=S_l$, and sample $Y=S_k$ where $S_k$ randomly drawn from the training corpus. FIG. 3 depicts the overall approach to bootstrap this lower bound. One can use a proxy $\tilde{I}^{\mathbb{P}}_{\theta,\omega}$ that has better gradient property than $I^{\mathbb{P}}_{\theta,\omega}$:

$$\tilde{I}^{\mathbb{P}}_{\theta,\omega} = E_{\mathbb{P}_{XY}}[-SP(-D_\theta(\phi_\omega^X, \phi_\omega^Y))] - E_{\mathbb{P}_X \otimes \mathbb{P}_Y}[SP(D_\theta(\phi_\omega^X, \phi_\omega^Y))] \quad (7.1)$$

where $SP(x)=\log(1+e^x)$. $I^{\mathbb{P}}_{\theta,\omega}$ remains a lower bound for any parameters.

The discriminator 116 may be trained to maximize the lower bound with respect to the one or more mutual information parameters $(\theta, \omega)$.

According to some embodiments, for example, maximizing $I^{\mathbb{P}}_{\theta,\omega}$ can be used to regularize the generator 115 model Q.

$I^{\mathbb{P}}_{\theta,\omega}(X,Y)$ can be viewed as a lower bound on the MI between $\phi$-encoded input segments, $I^{\mathbb{P}}(\phi_\omega(X), \phi_\omega(Y))$, by taking $D_\theta$ as the test function in the MINE bound.

Therefore, tightening the bound for $I^{\mathbb{P}}$ by maximizing with respect to the one or more mutual information parameters $(\theta, \omega)$; is equivalent to obtaining a better (lower bound) estimate of the MI between $\phi_\omega(X)$ and $\phi_\omega(Y)$, and maximizing the MI of the $\phi_\omega$-encodings ( $I^{\mathbb{P}}(X), \phi_\omega(Y)))$ using the better estimate. Using the data processing inequality, $I^{\mathbb{P}}(\phi_\omega(X), \phi_\omega(Y))$ is a lower bound of $I^{\mathbb{P}}(X,Y)$:

$$I^{\mathbb{P}}(X, Y) \leq I^{\mathbb{P}}(\phi_\omega(X), Y) \quad (8)$$

$$\leq I^{\mathbb{P}}(\phi_\omega(X), \phi_\omega(Y)) \quad (9)$$

$$\leq I^{\mathbb{P}}_\theta(\phi_\omega(X), \phi_\omega(Y)) \quad (10)$$

$$= I^{\mathbb{P}}_{\theta,\omega}(X, Y) \quad (11)$$

Eq. 8 holds due to the data processing inequality applied on the Markov relation $Y \to X \to \phi(X)$; and Eq. 9 holds by applying the data processing inequality on $\phi(X) \to Y \to \phi(Y)$. The Markov chains do not require an additional assumption, but merely a statement that $\phi(X)$ does not dependent on Y when X is given (similarly for the second Markov chain). Eq. 10 holds by applying the MINE bound with test function $D_\theta$ on the variables $\phi_\omega(X)$ and $\phi_\omega(Y)$, to obtain a lower bound on the MI of the encoded variables.

In example embodiments, maximizing mutual information discovered by the discriminator 116, rather than estimating its particular value, can be based on an estimated lower bound value $\tilde{I}^{\mathbb{P}}_{\theta,\omega}$:

$$\tilde{I}^{\mathbb{P}}_{\theta,\omega} = E_{\mathbb{P}_{XY}}[-SP(-D_\theta(\phi_\omega(X), \phi_\omega(Y)))] - E_{\mathbb{P}_X \otimes \mathbb{P}_Y}[SP(D_\theta(\phi_\omega(X), \phi_\omega(Y)))] \quad (12)$$

where $SP(x)=\log(1+e^x)$ is the softplus function.

The estimated lower bound value $\tilde{I}^{\mathbb{P}}_{\theta,\omega}$ may be easier to optimize than $I^{\mathbb{P}}_{\theta,\omega}$, while $I^{\mathbb{P}}_{\theta,\omega}$ remains a lower bound for the one or more mutual information parameters.

Optimizing $\tilde{I}^{\mathbb{P}}_{\theta,\omega}$ can be a binary classification problem with a binary cross-entropy loss, between samples from the series of elements 202 drawn from the joint distribution $\mathbb{P}_{XY}$ and samples drawn from the marginal distributions $\mathbb{P}_X$ and $\mathbb{P}_Y$. According to example embodiments, the approximate lower bound value can be used to as a regularizer term when training the discriminator 116 and the generator 115, or any element in the autoregressive neural network 114, promoting convergence during training.

In example embodiments, the discriminator 116 can be trained based on consecutive pairs of sentences, or any sequential element could also be regularized in theory, such as consecutive segments or sentences that are separated by some sequential gap.

To understand how does maximizing $I^{\mathbb{P}}_{\theta,\omega}$ regularize the model Q, note that the MI between the encodings is a lower bound on the MI of the raw inputs, by the Data Processing Inequality (DPI).

In other words, $I^{\mathbb{P}}(X;Y) \geq I^{\mathbb{P}}(\phi_\omega^X; \phi_\omega^Y)$, which can be proved in a straightforward way by applying the DPI twice:

$$I^{\mathbb{P}}(X;Y) \geq I^{\mathbb{P}}(X;\phi_\omega^Y) \geq I^{\mathbb{P}}(\phi_\omega^X, \phi_\omega^Y).$$

The first inequality holds due to the DPI applied on the markov chain $X \to Y \to \phi(Y)$; then the second one on $\phi(Y) \to X \to \phi(X)$. Note that the Markov chains are not additional assumption, but merely a statement that $\phi(X)$ does not dependent on Y when X is given (similarly for the first Markov chain).

Because $D_\theta$ is also the test function for the joint versus product of marginals on the random variables $\phi_\omega^X$ and $\phi_\omega^Y$, $$I^{\mathbb{P}}(X;Y) \geq I^{\mathbb{P}}(\phi_\omega^X, \phi_\omega^Y) \geq I^{\mathbb{P}}_\theta(\phi_\omega^X, \phi_\omega^Y) = I^{\mathbb{P}}_{\theta,\omega}(X,Y),$$ i.e., the MI of features is sandwiched between the MI of data and the parametric lower bound $I^{\mathbb{P}}_{\theta,\omega}$.

Therefore, while $I^{\mathbb{P}}(X;Y)$ is a fixed value for the data, estimating a bound for $I^{\mathbb{P}}$ by optimizing both $\theta$ and $\omega$ pushes the hidden representation to capture as much data MI as possible. Viewed from a different angle, it is equivalent to estimating a bound for the MI between $\phi_\omega^X$ and $\phi_\omega^Y$, $I^{\mathbb{P}}(\phi_\omega^X; \phi_\omega^Y)$ on (using the add-on discriminator $D_\theta$), and then optimize the Q-model features $\phi_\omega^X$ and $\phi_\omega^Y$ to have high mutual information.

Intuitively, this step encourages $\phi_\omega$s to be good representations of inputs that recognize related information in the data.

However, the MI of data $I^{\mathbb{P}}(X;Y)$ is a property of the data (distribution) $\mathbb{P}$, not of the model Q afterall. If the encoder is already very powerful, i.e., $I^{\mathbb{P}}(\phi_\omega^X, \phi_\omega^Y)$ already close to $I^{\mathbb{P}}(X;Y)$, the sandwiching effect from the lower bound would not be significant. This is consistent with observations of the recent works which drop NSP based on lack of empirical improvements. However, the theoretical connection to MI implies that one needs to maximize $I^Q$, which NSP (Phase-I) is not directly doing. As noted herein, phase 2 of the training is a method to directly optimize $I^Q$.

In phase 2, after sufficient training from Phase-I, the system takes the learned parameters $\theta$, $\omega$ to initialize the lower bound $I_{\theta\omega}^Q$. Optimizing $I_{\theta\omega}^Q$ poses a series of challenges as described herein. Applicant emphasizes that during phase 2, the system still optimizes $I^{\mathbb{P}}_{\theta,\omega}$ from phase 1, but just with an additional regularization term, which together approximate for $I_{\theta\omega}^Q$.

Referring now to FIG. 3, a diagram 300 of features being processed by the discriminator 116 according to an example embodiment is shown.

The discriminator 116 may be trained to optimize (alternatively referred to as learning) a lower bound $\tilde{I}_\zeta^{\mathbb{P}}$ of the MI of the series of elements 202, denoted by $I^{\mathbb{P}}$, based on one or more mutual information parameters $\zeta$. The discriminator 116 may take the form of a classifier that shares some parameters with the generator 115 model Q and separates plurality of first features 204 and second features 206 into categories of a joint distribution, where the features have mutual information, and a product of marginals, where features do not contain mutual information.

For example, as shown in FIG. 3, a pair of features, exhibiting mutual information, and therefore representative of the distribution $\mathbb{P}$ XY, is sampled, comprising the first feature 204, shown as $X=S_1$ for some element indexed 4 and the second feature 206, shown as $Y=S_{l+1}$, $(X,Y)=(S_l,S_{l+1})$, to form a positive training example of mutual information for the discriminator 116. To sample from pairs of features which exhibit marginal interrelationship, the first feature 204 may be sampled as $X=S_l$, in conjunction with a third feature 306 $Y=S_k$, where $S_k$ is some sentence sampled from the training corpus which is non-consecutive. The discriminator 116 trains to learn or optimize the one or more mutual information parameters based on a value 302 of the test function $T_{\theta,\omega}(X,Y)$ and the first feature 204 and the second feature 206 and value 306 based on the test function $T_{\theta,\omega}(X,Y)$ and the first feature 204 and the third feature 306.

In example embodiments, training the discriminator 116 to tighten the lower bound can automatically force a hidden representation of the generator 115 model Q to preserve as much MI as possible.

The learned one or more mutual information parameters can then be applied to the generator 115 model Q, which determines MI according to a distribution separate from the distribution within the discriminator 116, to get a lower bound $I_\zeta^Q \leq I^Q$.

In example embodiments, in addition to continuing to optimize $\tilde{I}_\zeta^{\mathbb{P}}$, $I_\zeta^Q$, denoting a measure of mutual information exhibited by the generator 115 model Q, is incorporated into a generator reward model within the generator 115 to encourage high mutual information generation by the generator 115, which may have a more direct regularizing effect than $\tilde{I}_\zeta^{\mathbb{P}}$.

Directly optimizing $I_\zeta^Q$ requires sampling from the generator 115 and learning via policy gradient (or other gradient estimators). However, deep reinforcement learning (RL) may be computationally demanding and converges slowly due to high variance.

According to some embodiments, for example, the generator 115 is trained according to a more sample efficient approach, the reward augmented maximum likelihood (RAML), to increase long range dependency of subsequent elements generated by the generator 115 based on mutual information. RAML may not directly support the MI lower bound being incorporated as the reward. A modification via importance sampling may be appropriate for adapting the MI lower bound with the RAML approach to training the generator 115.

Estimating the lower bound with $\tilde{I}_{\theta,\omega}^{\mathbb{P}}$ the discriminator 116, as described herein, bootstraps a regularizer term (or has a regularizing effect on). However, its effect is indirect on the generator 115 as the MI lower bound concerns the distribution of mutual information within the series of elements 202, $\mathbb{P}$.

The regularizing term within the discriminator 116 only ensures that the discriminator 116 captures the right information in the features to recognize high mutual information from the distribution of the series of elements, but it does not guarantee high mutual information under the distribution relied upon by the generator 115 model Q to generate subsequent elements. As a result, subsequent elements generated by the generator 115 might not exhibit high mutual information similar to the information processed by the discriminator 116.

According to example embodiments, the one or more mutual information parameters $(\theta, \omega)$ which may identify mutual information $I_{\theta,\omega}^{\mathbb{P}}$ (and are learned through the approximate mutual information $\tilde{I}_{\theta,\omega}^{\mathbb{P}}$), are applied to determine a lower bound $I^Q \geq I_{\theta,\omega}^Q$ of mutual information which is incorporated within the generator 115 model Q.

The one or more mutual information parameters may be incorporated into the generator 115 after the discriminator 116 training has converged. In example embodiments, the discriminator 116 and the generator 115 are simultaneously trained and the one or more mutual information parameters are continuously updated during training. For example, the one or more mutual information parameters may be continually optimized during training of the autoregressive model 114 by determining $I_{\theta,\omega}^{\mathbb{P}}$, and, after the discriminator 116 has converged, an additional regularization term for $I_{\theta,\omega}^Q$ is added to the autoregressive model 114 gradient to promote convergence. According to example embodiments, the one or more mutual information parameters are incorporated into the generator 115 after sufficient learning through the maximum likelihood objective with the discriminator 116, which makes $\mathbb{P}$ and Q to be close.

By re-using $\theta$, $\omega$, a reasonable bound for the mutual information within the generator 115 model Q, denoted by $I_{\theta,\omega}^Q$, can be used in place of precise values of mutual information within the distribution of the generator 115 model Q $I^Q$ which can serve as a regularization term.

Because the MINE bound holds for any parameters, the binary classification form can be used to optimize the one or more parameters, similar to the operations for $I_{\theta,\omega}^{\mathbb{P}}$, set out above. The proxy objective can take the form:

$$\tilde{I}_{\theta,\omega}^Q = E_{Q_{XY}} R_{\theta,\omega}^+ - E_{Q_X \otimes Q_Y} R_{\theta,\omega}^-, \text{ where,}$$

$$R_{\theta,\omega}^+ = -SP(-D_\theta(\phi_\omega(X), \phi_\omega(Y)))$$

$$R_{\theta,\omega}^- = -SP(-D_\theta(\phi_\omega(X), \phi_\omega(Y)))$$

To optimize $\tilde{I}_{\theta,\omega}^Q$ with respect to the one or more mutual information parameters $\zeta=(\theta, \omega)$, the gradient has two sources of contribution $$\nabla_\zeta \tilde{I}_{\theta,\omega}^Q = g_1 + g_2, \text{ where}$$

$$g_1 = E_{Q_{XY}} \nabla R_{\theta,\omega}^+ - E_{Q_X \otimes Q_Y} \nabla R_{\theta,\omega}^- \quad (14)$$

$$g_2 = E_{Q_{XY}} R_{\theta,\omega}^+ \nabla \log Q_{XY} - E_{Q_X \otimes Q_Y} R_{\theta,\omega}^- (\nabla \log Q_X + \nabla \log Q_Y) \quad (15)$$

$g_2$ is essentially the policy gradient with generator 115 model Q being the policy while $R^+$ and $R^-$ being a reward model (and penalty). The gradient can be further variance-reduced through a number of control-variate methods.

Deep reinforcement learning (RL) is known to converge slowly due to high variance and have high computational costs, in training the generator 115 with RL. According to some embodiments, for example, instead of using RL, the generator is trained according to the reward augmented maximum likelihood (RAML) approach, which may have the same global extremum as an RL objective.

Applicants' trials confirm the difficulty in this particular case. Furthermore, sampling from Q is generally slow for autoregressive models as it cannot be easily parallelized. These two issues compounded means that Applicants would like to avoid sampling from Q. To this end, Applicants develop a modification of the reward augmented maximum likelihood (RAML), which avoids the high variance and slow Q-sampling.

For the $g_1$ part (Eq. 14), if one replaces the Q distributions with $\mathbb{P}$ in the expectation, the approach can recover the Phase 1 regularizer Eq. (7.1), which Applicants can use to approximate $g_1$. The bias of this approximation is:

$$E_{X,Y}(X,Y) - \mathbb{P}(X,Y))\nabla R^+$$

$$-E_{X,Y}(Q(X)Q(Y) - \mathbb{P}(X)\mathbb{P}(Y))\nabla R^-$$

which becomes small as the maximum likelihood learning progresses, because in both terms, the total variation distance $\Sigma|Q - \mathbb{P}|$ is bounded by $\sqrt{2KL\mathbb{P}Q}$ via Pinsker's inequality.

RAML Background

RAML incorporates the usual maximum likelihood objective ($L_{MLE}$) and entropy-regularized reinforcement learning objective $L_{RL}$, which can respectively can be written as (up to constant and scaling):

$$L_{MLE} = \sum_{(X,Y^*)\in D} KL(\delta(Y|Y^*)\|Q_\omega(Y|X)) \quad (16)$$

$$L_{RL} = \sum_{(X,Y^*)\in D} KL(Q_\omega(Y|X)\|p_\tau^*(Y|Y^*)) \quad (17)$$

where $\delta(Y|Y^*)$ is the delta distribution which is 1 if and only if $p_T^*(Y|Y^*)$; and is the exponentiated pay-off distribution, defined as:

$$p_\tau^*(Y|Y^*) = \frac{\exp\{r(Y,Y^*)/\tau\}}{Z(Y^*,\tau)} \quad (18)$$

where $r(Y,Y^*)$ is a reward function that measures some similarity of Y with respect to the ground truth sequence $Y^*$ (e.g. negative edit-distance). The differences between RAML and MLE are two-fold: first, the forward and reverse KL divergence; and second, delta and the exponentiated payoff distribution. Augment maximum likelihood learning may be proposed with characteristics of RL objective via the RAML objective:

$$L_{RAML} = \sum_{(X,Y^*)\in D} KL(p_\tau^*(Y|Y^*)\|Q_\omega(Y|X)) \quad (19)$$

Comparing Eq. 19 with 17, the only difference is the distributions in the KL divergence are reversed. But these two losses have the same global extremum, and when away from extremum, they are closely related.

To minimize the RAML objective:

$$\nabla L_{RAML} = -E_{p_\tau^*(Y|Y^*)} \nabla \log Q_\omega(Y|X) \quad (20)$$

comparing to the policy gradient:

$$\nabla L_{RL} = -E_{Q_\omega(Y|X)} r(Y,Y^*) \nabla \log Q_\omega(Y|X) \quad (21)$$

RAML can be viewed as optimizing the reverse direction of KL divergence comparing to the entropy-regularized policy gradient RL objective. The important information is that the RAML gradient with the policy gradient are:

$$\nabla L_{RAML} = -E_{p_\beta^*(Y|Y^*)}\{\nabla \log Q_\omega(Y|X)\}$$

$$\nabla L_{RL} = -E_{Q_\omega(Y|X)}\{r(Y,Y^*)\nabla \log Q_\omega(Y|X)\}$$

where $p^*_\beta(Y|Y^*)$ is the exponentiated pay-off distribution defined as:

$$p_{\beta^*}(Y|Y^*) = \exp\{r(Y,Y^*)/\beta\}/Z(Y^*,\beta)$$

$r(Y, Y^*)$ is a reward function that measures some similarity of Y with respect to the ground truth $Y^*$ (e.g. negative edit-distance). RAML gradient samples from a stationary distribution, while policy gradient samples from the changing $Q_\omega$ distribution. Furthermore, by definition, samples from $p^*_\beta(Y|Y^*)$ has higher chance for high reward, while samples $Q_\omega(Y|X)$ relies on exploration. For these reasons, RAML has much lower variance than RL.

RAML with MI Reward

A key property of a RAML gradient model is a sampling algorithm which samples from an exponentiated pay-off distribution instead of a policy distribution of the autoregressive model 114, allowing Eq. 24 to have a lower variance than the policy gradient in Eq. 21.

Sampling from the exponentiated pay-off distribution resembles the loss-augmented Maximum a posteriori (MAP) inference in structural prediction, and can only be done efficiently for special classes of reward, such as the edit-distance.

A learned MI estimator, more specifically the discriminator 116 scores in processing feature pairs, may be used as the reward in training the generator 115 in accordance with the RAML approach. Assume $Y^*$ is the segment/sentence following X in the corpus, then for any other Y, the reward is:

$$r(Y,Y^*;X) = D_\Theta(\phi_\omega(X),\phi_\omega(Y)) - D_\Theta(\phi_\omega(X),\phi_\omega(Y^*)) \quad (22)$$

Figure 4:
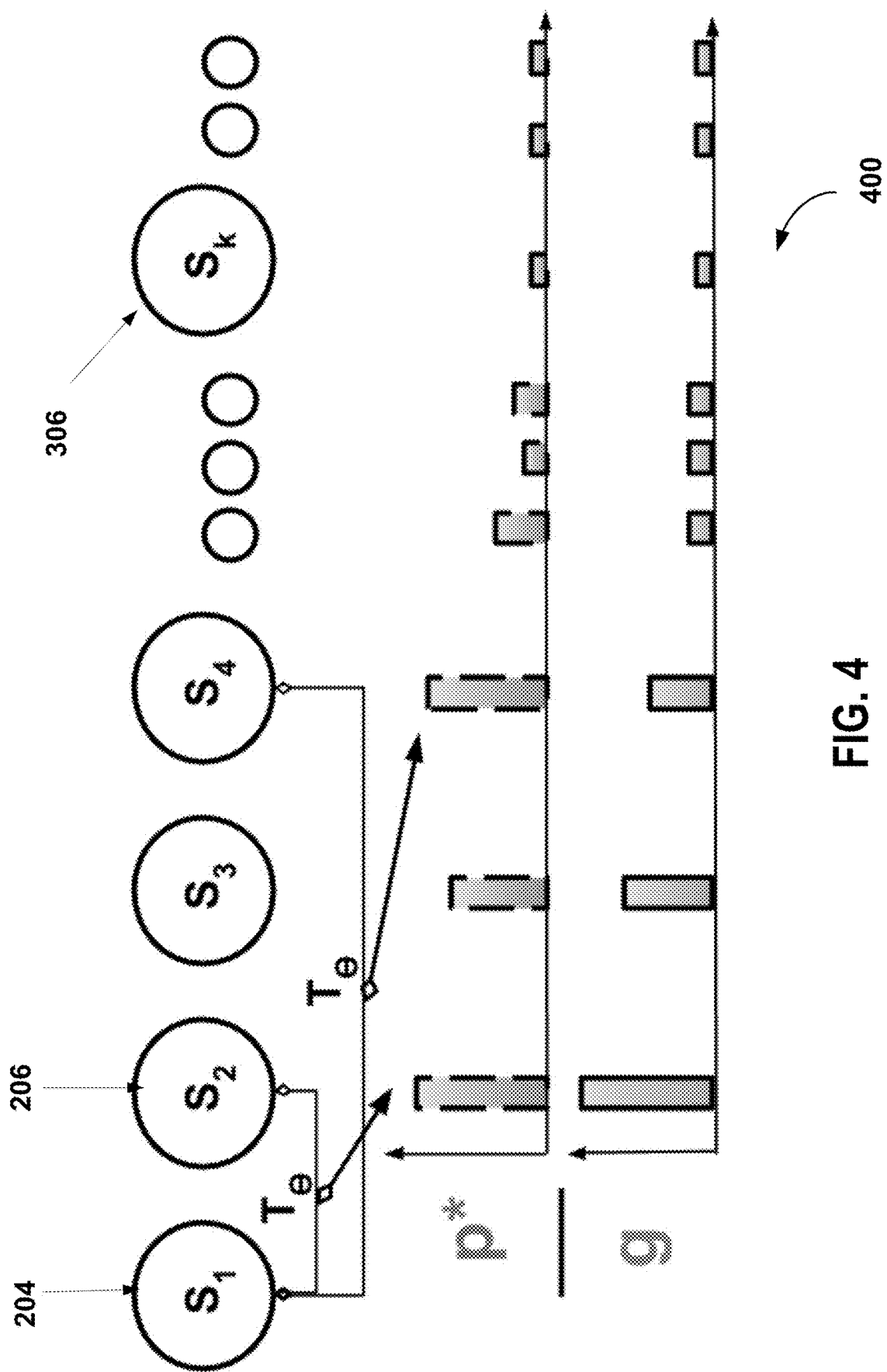
FIG. 4 is an illustration depicting importance-weighted reward augmented maximum likelihood as implemented by a regularizer, in accordance with an example embodiment.

In the illustration shown in FIG. 4, the sampled features the first feature 204, alternatively referred to as X, shown as $S_1$ and the second feature 206, alternatively referred to as $Y^*$ and shown as $S_2$, and the third feature 306, alternatively referred to as Y and shown as $S_4$ are sampled to be evaluated by the generator 115. Y could also be any other sentence/segment not in the series of elements. In example embodiments, S4 represents another nearby sentence, and the IWRAML method comprises maximizing the conditional log likelihood of S4 given S1 but with an appropriate weight, which is calculated using the discriminator 116.

Unfortunately, these discriminator 116 scores lack the simple structure like in edit-distance that can be exploited for efficient sampling as exponentiated pay-off distribution. Hence, direct application of RAML to the MI reward is not easy.

In example embodiments, an efficient alternative based on importance sampling is based on the Intuition that sentences or sequences spatially close to the first feature 204 are more likely to be related as compared to non-sequential features. The consecutive or closer features hence scoring higher under the discriminator 116, and can be configured to consequently have higher probability under the exponentiated pay-off distribution. At the same time, features (i.e. sentences) that are further away in the corpus are less likely have high MI with the first element 204 (X). Therefore, a geometric distribution based at the index of $Y^*$ may be incorporated into the generator 115.

Where Y* has a sentence/segment index m, then $$g(Y=S_k|Y^*=S_m)=(1-\lambda)^{(k-m)}\lambda \quad (23)$$

where A is a hyperparameter (which in example embodiments may be set to 0.3). With g incorporated into the distribution of the generator 115, an example importance weighted RAML (IW-RAML) gradient is then:

$$\nabla L_{RAML} = -E_g\left(\frac{p_\tau^*(Y|Y^*)}{g(Y|Y^*)}\right)\nabla \log Q_\omega(Y|X) \quad (24)$$

Other proposals are also possible. With G as the proposal, the importance weighted RAML (IW-RAML) gradient is then:

$$\nabla L_{RAML} = E_G(\nabla \log Q_\omega(Y|X)p_{\beta^*}(Y|Y^*)/G(Y|Y^*))$$

Because the reward is shift-standardized with respect to the discriminator score at Y*, one can assume that the normalization constant Z in does not vary heavily for different Y*, so that one can perform self-normalizing importance sampling by averaging across the mini-batches.

Bias-Variance Trade-off of IW-RAML

The reward model (r(Y,Y*;X) is defined over all possible features (i.e. sentence/segments), and not just the features derived from the series of elements used as a training dataset. As a result, a bias is introduced when incorporating the IWRAML into the autoregressive model 114. However, over the features (i.e. sentences/segments) in the corpus, g is a reasonably good proposal, and the sampling space is much smaller, so the variance is very low. A possible side-effect of introducing g into the autoregressive model 114 may be that the exponentiated pay-off distribution is no longer stationary like in the original RAML with a simple reward that the reward function in Eq. 22 depends on (θ, ω). Stationarity of the sampling distribution is one of the reasons RAML is believed to have lower variance comparing to policy gradient RL. While the proposed discriminator 116 configuration may lose this property, the generator 115 may re-gain stationarity of sampling distribution through the incorporation of the fixed g, which may keep the variance low.

Choosing IW-RAML over RL is essentially a bias-variance trade-off. The RL objective gradient in Eq. 14-15 is the unbiased one, and IW-RAML as introduced may exhibit a few biases, including using the opposite direction of the KL divergence, dropping the softplus nonlinearity in reward definition Eq. 22, and there may be a support mismatch between g and $p_\tau^*(Y|Y^*)$ which does not cover the space of all possible features (i.e. sentences). These approximations may introduce some bias, but the overall variance is significantly reduced, which is the reason the overall method works. Given enough computation resources and tuning, the deep RL approach may be appropriate.

Figure 7A:
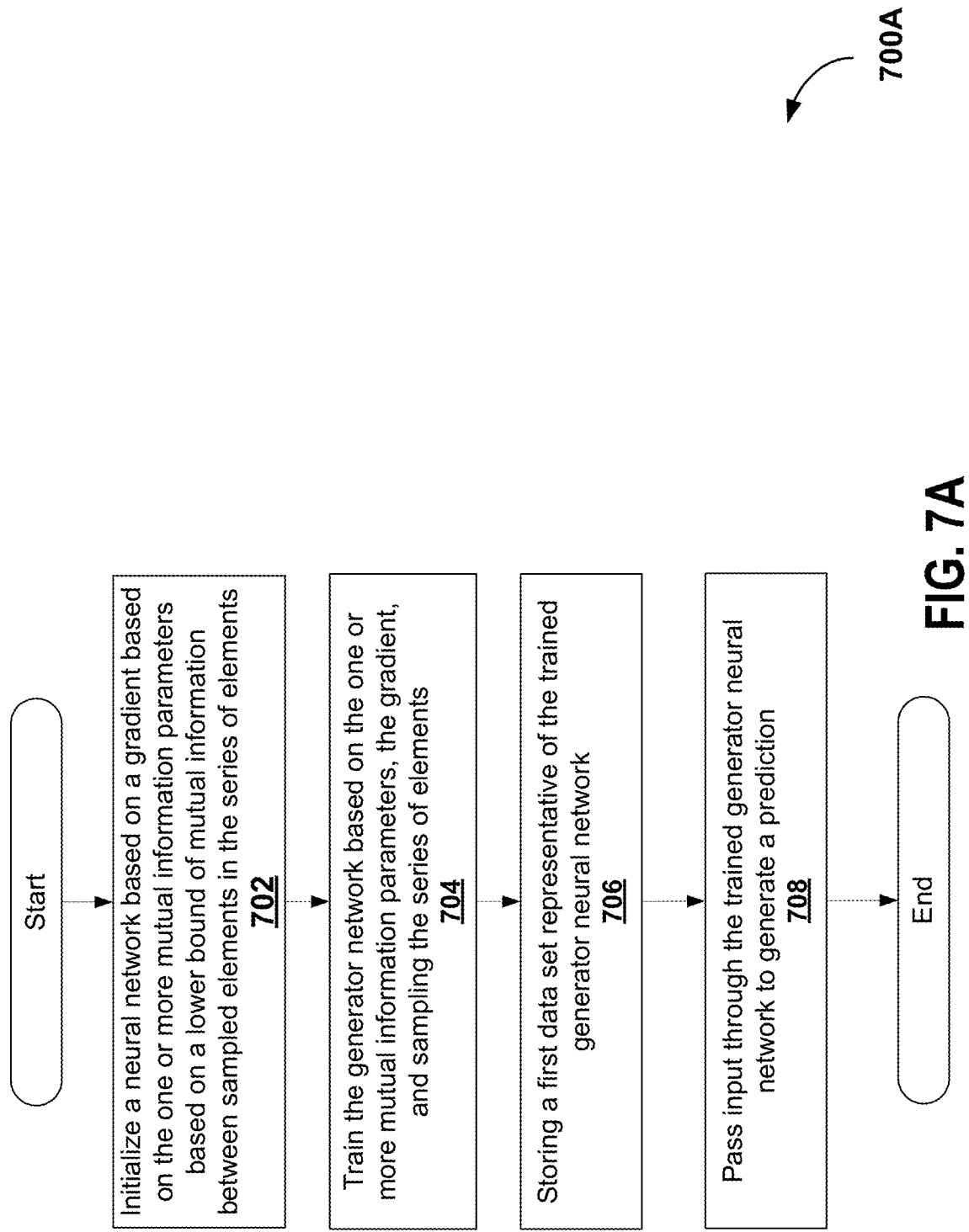
FIG. 7A and FIG. 7B are method diagrams depicting an example method of training an autoregressive model with a series of elements, according to some embodiments.

Referring now to FIG. 7A, an example method 700A of training an autoregressive model 114 with a series of elements is shown.

At step 702, a generator 115 is initialized based on a gradient based on the one or more mutual information parameters based on a lower bound of mutual information between sampled elements in the series of elements. In example embodiments, the generator 115 receives the series of elements 202 or a series of features from an existing system.

At step 704, the generator 115 is trained based on the one or more mutual information parameters, the gradient, and the series of elements.

At step 706, a first data set representative of the trained generator 115 is stored.

Figure 7B:
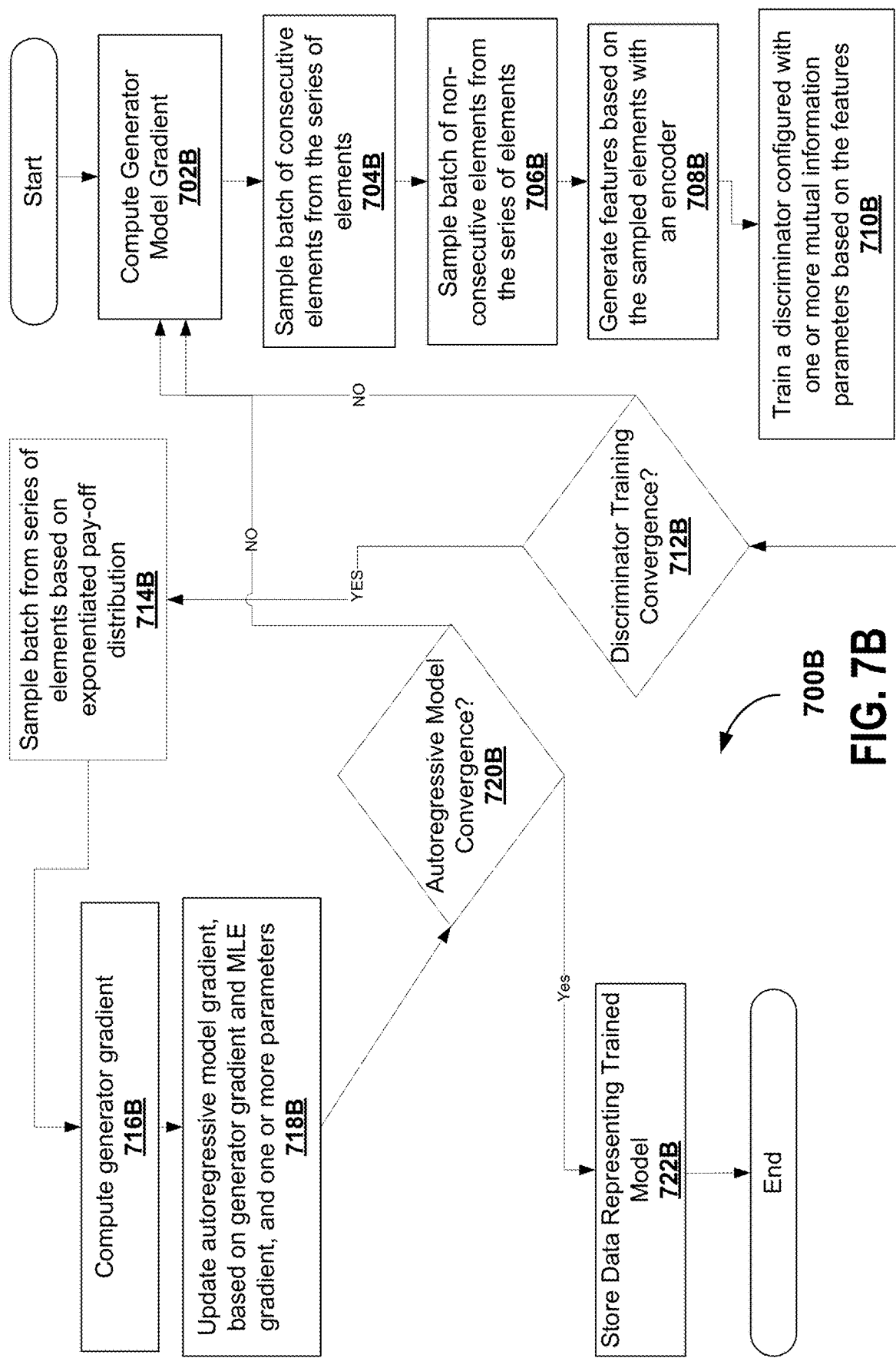

Referring now to FIG. 7B, a method 700B of training an autoregressive model 114 with a series of elements is shown.

Step 702B a gradient of an initialized generator 115 is computed. The gradient may enable learning by the generator by maximizing the log likelihood of subsequent observations with respect to the parameters of Q.

At steps 704B, and 706B batches of consecutive elements and non-consecutive elements are sampled from the series of elements 202, respectively. According to some example embodiments, the sampling non-consecutive comprises sampling from other than the series of elements 202.

At step 708B, the encoder 117 processes the sampled elements from steps 704B and 706B and generates features.

At step 710B, the discriminator 116 is trained based on the consecutive elements and non-consecutive elements to optimize the one or more mutual information parameters. According to example embodiments, the discriminator 116 determines a discriminator gradient.

At step 712B, the autoregressive model 114 determines whether the discriminator 116 is converging.

Where the discriminator 116 has not converged at step 712B, the method 700B reiterates steps 702B, 704B, 706B, 708B, 710B until the discriminator does converge.

At step 714B, where the autoregressive model 114 determines the discriminator 116 is converging, the series of elements 202 is further sampled based on a geometric distribution based on a sampled element index.

At step 716B, the generator 115 gradient, which has a component based on the one or more mutual information parameters based on a lower bound of mutual information between sampled elements in the series of elements, is determined.

At step 718B, the generator gradient, the discriminator gradient, and the gradient are summarized, and the one or more mutual information parameters are updated.

At step 720B, the autoregressive model 114 determines whether the autoregressive model 114 is converging.

Where the autoregressive model 114 has not the remaining steps of method 700B are repeated until the autoregressive model 114 converges.

At step 722B, where the autoregressive model 114 is converging, or has converged, a first data set representing the trained autoregressive model 114 is stored.

An example embodiment of a method of training a generator 115 is shown below:

---

Algorithm 1 Language Model Learning with BMI regularizer

1: Input: batch size M, dataset Ω, proposal distribution G, maximum number of iterations N.
2: phase-two := false
3: for itr = 1,....N do
4:    Compute LM objective $L_{MLE}(\omega)$ from Eq. 1 and its gradient; # ①
5:    Sample a mini-batch of consecutive sentences $\{X_g, Y_g\}_1^M$ from Ω as samples from $\mathbb{P}_{XY}$;
6:    Sample another mini-batch of $\{Y_{g^-}\}_1^M$ from Ω to form $\{X_g, Y_{g^-}\}_1^M$ as samples from $\mathbb{P}_X \otimes \mathbb{P}_Y$;
7:    Extract features $\phi_\omega^X, \phi_\omega^Y$ and $\phi_\omega^{Y-}$ and compute $I_{\theta,\omega}^P$ according to Eq. 6 and its gradient; # ②
8:    if phase-two then
9:      Sample a mini-batch of $(\bar{Y}_g)_1^M$ from Ω according to G, each with corresponding $Y^* = Y_g$,
10:      Compute IW-RAML gradients according to Eq. 17, with $Y^* = Y_g, Y = \bar{Y}_g$, and $X = X_g$, # ③
11:    end if -continued ---
Algorithm 1 Language Model Learning with BMI regularizer
---
12:   Add gradient contributions from ①, ②, ③ and update parameters ω and θ
13:   If not phase-two and meeting switch condition then
14:     phase-two := true
15:   end If
16: end for
---

Experiments

Two widely used benchmarks on word-level language modeling were processed with a trained, Penn Treebank and WikiText-2. The recent state-of-the-art model on these two benchmarks, AWD-LSTM-MoS as the baseline.

The baseline with the same model adding variants of the proposed regularizer is compared, Bootstrapping Mutual Information (BMI) regularizer: (1) BMI-base: apply Phase-I throughout the training; (2) BMI-full: apply Phase-I until a good enough $D_\theta$ is learned then apply both Phase-I and Phase-II.

Experimental Setup

In the experiments, the max-pooling over the hidden states for all the layers in LSTM are concatenated as $\phi_\omega$-encoding.

Given the input encodings $\phi_\omega^x = \phi_\omega(X)$ and $\phi_\omega^y = \phi_\omega(Y)$, a one-layer feedforward network with the input representation as $[\phi_\omega^x, \phi_\omega^y, \phi_\omega^x - \phi_\omega^y | \phi_\omega^x - \phi_\omega^y |, \phi_\omega^x * \phi_\omega^y]$ can be used to test the discriminator function $D_\theta$ whose number of hidden units is 500. The Adam optimizer with learning rate as $2e^{-4}$ and weight decay as $1e^{-6}$ is applied on θ.

All the above hyperparameters are chosen by validation perplexity on Penn Treebank and applied directly to Wiki-Text-2. The weight of the regularizer term is set to 0.1 for Penn Treebank and 0.05 for WikiText-2 chosen by validation perplexity on their respective datasets. The temperature hyperparameter T in RAML is set to 1, and A hyperparameter of importance sample proposal g to 0.3, both without tuning.

All experiments were conducted on single (1080Ti) GPUs with PyTorch. Applicants manually tuned the following hyperparameters based on validation perplexity: the BMI regularizer weights in [0.01,0.02,0.05,0.1,1.]; $D_\theta$ hidden state size from [100,300,500,1000], Adam learning rate from [1e–3,2 e–4].

Perplexity and Reverse Perplexity

TABLE 1

Perplexity and reverse perplexity on PTB and WT2.

| | PTB | | | | WT2 | | | |
|---|---|---|---|---|---|---|---|---|
| | PPL | | Reverse PPL | | PPL | | Reverse PPL | |
| Model | Valid | Test | Valid | Test | Valid | Test | Valid | Test |
| AWD-LSTM-MoS | 58.08 | 55.97 | 82.88 | 77.57 | 66.01 | 63.33 | 93.59 | 88.79 |
| BMI-base | 57.16 | 55.02 | 80.64 | 75.31 | 64.24 | 61.67 | 90.95 | 86.31 |
| BMI-full | 56.85 | 54.65. | 78.46 | 73.73 | 63.86 | 61.37 | 90.20 | 85.11 |
| AWD-LSTM-MoS (ft.) | 56.54 | 54.44 | 80.29 | 75.51 | 63.86 | 61.45 | 91.32 | 85.69 |
| BMI-base (ft.) | 56.05 | 53.97 | 78.04 | 73.35 | 63.14 | 60.61 | 89.09 | 84.01 |
| BMI-full (ft.) | 55.61 | 53.67 | 75.81 | 71.81 | 62.99 | 60.51 | 88.27 | 83.73 |

The results of language modeling on PTB are presented in Table 1 above. The baseline and the models with variants of the proposed regularizer without finetune and with finetune described in the baseline paper. In all these settings, the models with the proposed regularizer outperforms the baseline.

TABLE 2

Estimated MI (lower bounds) of X and Y, two random segments of length 40 separated by 10 tokens. Estimations using 10-fold cross-validation awl testing.

| Generations | PTB | WT2 |
|---|---|---|
| AWD-LSTM-MoS | 0.25 ± 0.03 | 0.76 ± 0.03 |
| BMI-base | 0.47 ± 0.03 | 0.88 ± 0.05 |
| BMI-full | 0.48 ± 0.03 | 1.01 ± 0.06 |
| Real Data | 1.18 ± 0.08 | 2.14 ± 0.07 |

Table 2 presents the main results of language modeling. Applicants evaluate the baseline and variants of the approach of some embodiments with and without finetune described in a baseline paper. In all settings, the models with BMI outperforms the baseline, and BMI-full (with IW-RAML) yields further improvement on top of BMI-base (without IW-RAML).

In some embodiments, the reverse perplexity is used to measure the generation quality. A chunk of text with 6 million tokens from each of the models is generated to train an RNN language model on generated text and evaluate perplexity on held-out data given in PTB. As shown in Table 2, the models with the proposed regularizer improve the reverse perplexity over the baseline by a significantly large margin indicating better generation diversity, which is to be expected as MI regularizer encourages higher marginal entropy (in addition to lower conditional entropy).

Figure 5:
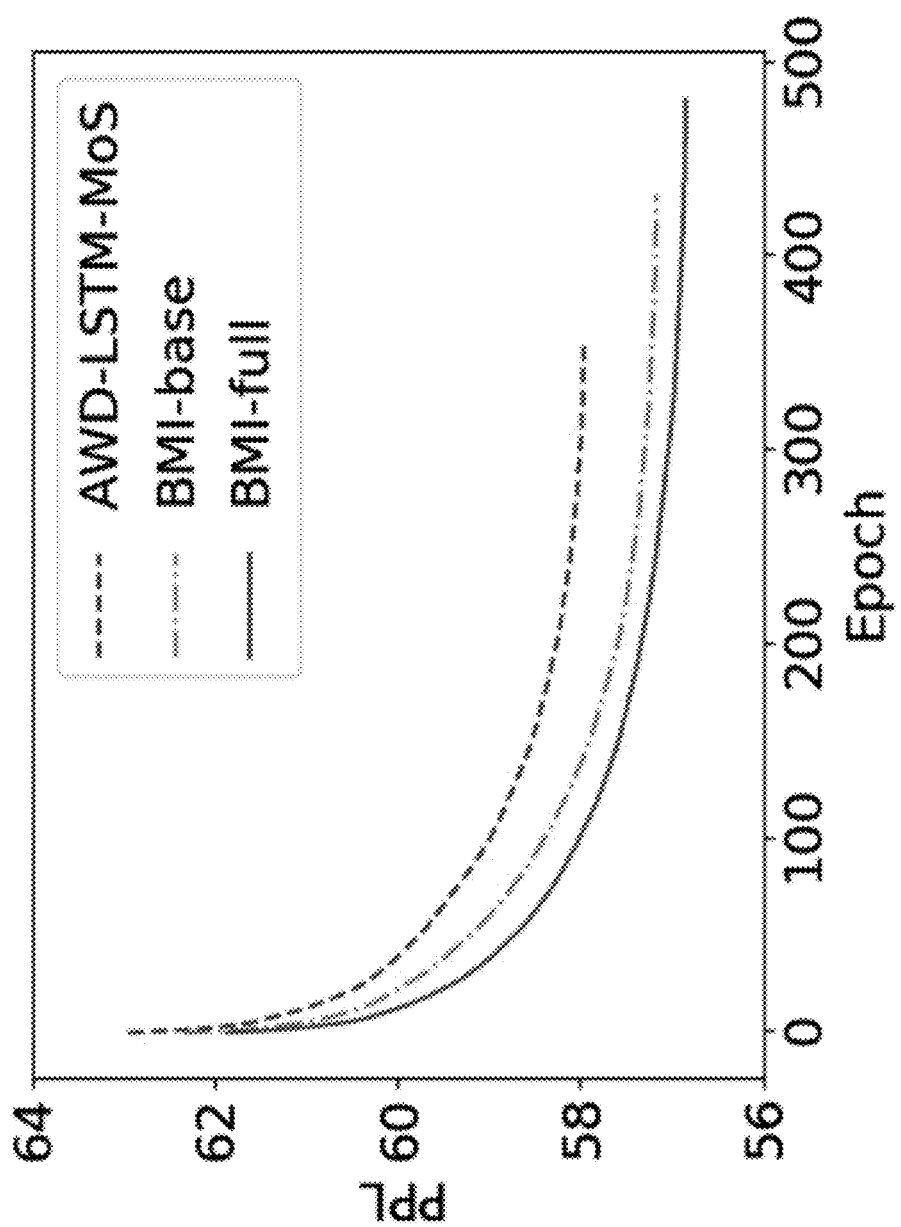
FIG. 5 is a graph plot showing learning curves for validation on the Penn Treebank dataset, according to some embodiments.

FIG. 5 shows a learning curve for validation perplexity on Penn Treebank after switching.

Figure 6:
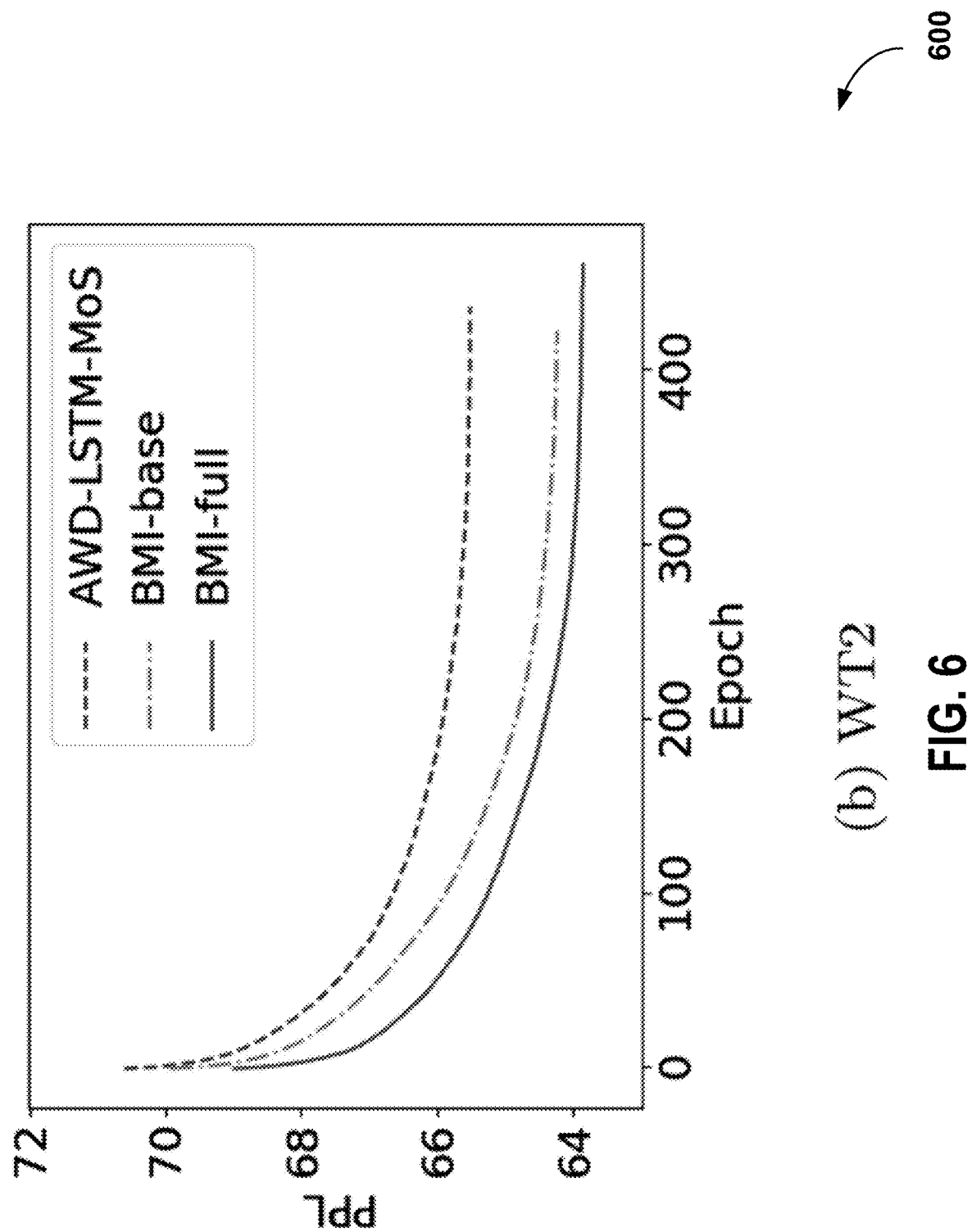
FIG. 6 is a graph plot showing learning curves for validation on the WikiText2 data set, according to some embodiments.

FIG. 6 shows a learning curve for validation perplexity on WikiText-2 after switching.

FIGS. 5 and 6 shows the learning curves of each model on both datasets after switching to ASGD as mentioned earlier in the experiment setup. The validation perplexities of BMI models decrease faster than the baseline AWDLSTM-MoS. In addition, BMI-full is also consistently better than BMI-base and can further decrease the perplexity after BMI-base and AWD-LSTM-MoS stop decreasing.

Empirical MI on Generations

To verify that BMI indeed increased $I^\Omega$, Applicants measure the sample MI of generated texts as well as the training corpus. MI of long sequence pairs cannot be directly computed from samples, Applicants instead estimate lower bounds by learning evaluation discriminators, $D_{eval}$ on the generated text. $D_{eval}$ is completely separate from the learned model, and is much smaller in size. Applicants train $D_{eval}$'s using the proxy objective and early-stop based on the MINE lower bound on validation set, then report the MINE bound value on the test set. This estimated lower bound essentially measures the degree of dependency. Table 2 shows that BMI generations exhibit higher MI than those of the baseline AWD-LSTM-MoS, while BMI-full improves over BMI-base.

Analysis: RL Vs. IW-RAML Variance

Figure 8:
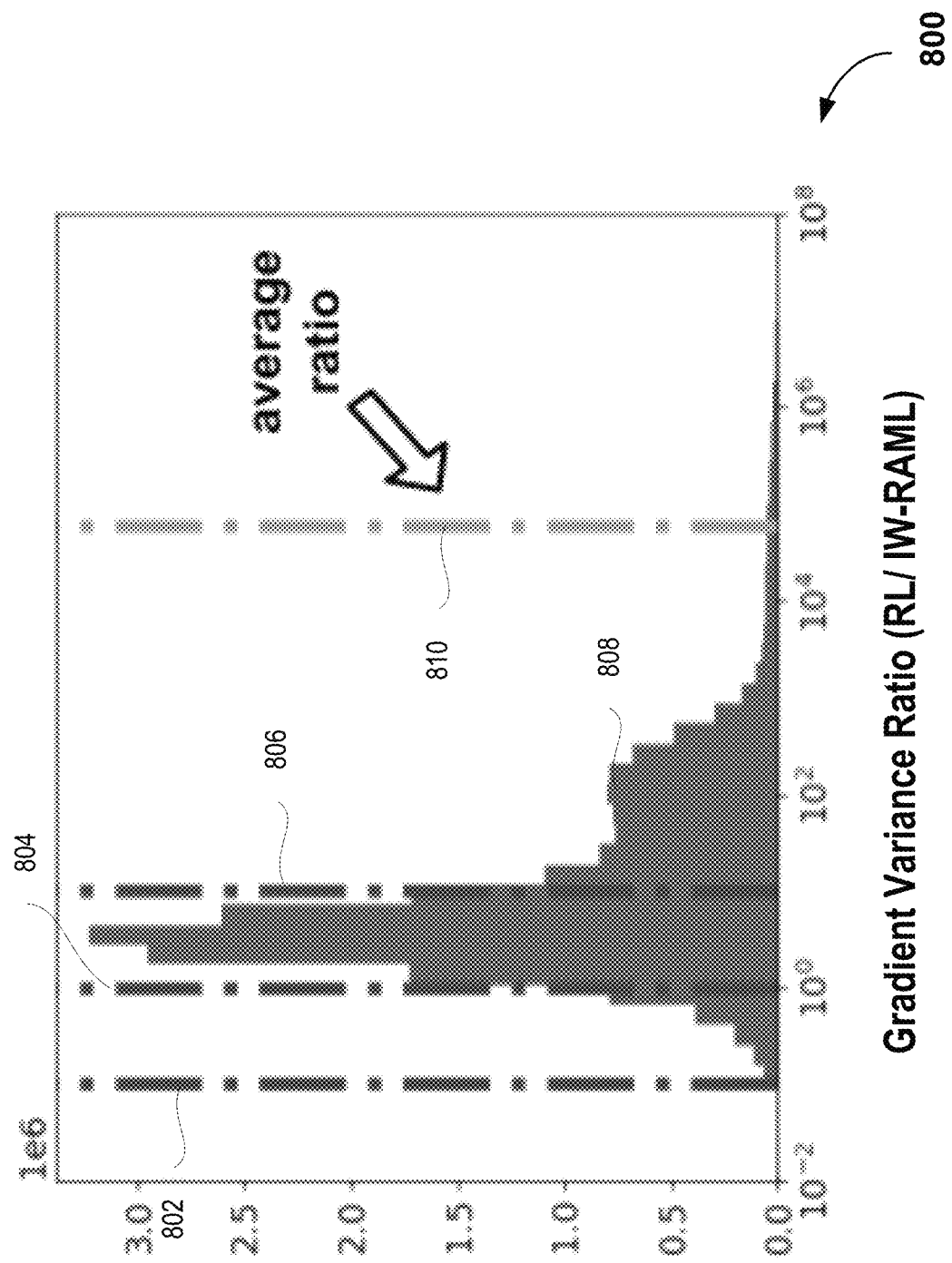
FIG. 8 is a histogram showing a gradient variance ratio, according to some embodiments.

FIG. 8 compares the gradient variance under RL and IW-RAML on PTB. The gradient variance for each parameter is estimated over 200 iterations after the initial learning stops and switches to ASGD; the ratio of variance of the corresponding parameters is then aggregated into the histogram. For RL, Applicants use policy gradient with self-critical baseline for variance reduction. Only gradient contributions from the regularizers are measured, while the language model MLE objective is excluded.

Dotted line 804 indicates the ratio of 1, dotted lines 802 and 806 indicate the ratio of 0.1 and 10, and dotted line 810 indicates the average ratio of RL against IW-RAML.

The histogram of FIG. 8 shows that the RL variance is more than $10^4$ times larger than IW-RAML on average, and almost all of the parameters having higher gradient variance under RL. A significant portion also has 1-4 orders of magnitude higher variance under RL than under IW-RAML. For this reason, policy gradient RL does not contribute to learning when applied in phase 2 in the trials.

Conclusion

As described in various embodiments, there is proposed a principled mutual information regularizer for improving long-range dependency in sequence modelling. The work also provides more principled explanation for the next token prediction (e.g., next sentence prediction—NSP) heuristic, but improves on it with a method for directly maximizing the mutual information of sequence variables. The embodiments are not limited to sentences. For example, encouraging high MI between the title, the first sentence of a paragraph, or the first sentence of an article, with the other sentences in the same context are also possible.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to speech-related applications.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

What is claimed is:

1. A computer implemented system for training a first neural network representing data model Q, the system comprising:
   a computer processor operating in conjunction with computer memory and a data storage maintaining one or more interconnected computing nodes having adaptive interconnections which represent the first neural network, the computer processor configured to:
   initialize the first neural network by providing a discriminator neural network parametrized by $\theta$ for hidden features of the data model Q parametrized by $\omega$, the discriminator neural network observing pairs of segments or sequence in an input data set;
   conduct a next token prediction training process of the data model Q, the next token prediction training process adapted for learning to classify a correct next token from a randomly sampled token until a switching condition is satisfied to provide parameters $\theta$, $\omega$, the next token prediction training process establishing a lower bound of mutual information $I_{\theta,\omega}^{\mathbb{P}}$ between sampled elements in the series of elements from the data distribution P;
   establish a lower bound of mutual information $I_{\theta,\omega}^Q$ in the data model Q based on the parameters $\theta$, $\omega$;
   train the discriminator neural network to optimize $I_{\theta,\omega}^{\mathbb{P}}$; and
   after the discriminator neural network has converged, incorporate $I_{\theta,\omega}^Q$ as a reward for training the first neural network representing the data model Q to optimize the mutual information in the data model Q between two random variables X and Y, $I^Q(X; Y)$, the training causing updates to the adaptive interconnections of the one or more interconnected computing nodes of the first neural network.

2. The system of claim 1, wherein mutual information I(X; Y) between two random variables X and Y is defined as a Kullback-Leibler (KL) divergence between a joint $\mathbb{P}_{XY}$ and a product of marginal distributions $\mathbb{P}_X \otimes \mathbb{P}_Y$ of two random variables established by the relation:

$$I(X;Y) = KL(\mathbb{P}_{XY} \| \mathbb{P}_X \otimes \mathbb{P}_Y).$$

3. The system of claim 1, wherein the mutual information I(X; Y) between two random variables X and Y is defined as the difference between entropy and conditional entropy:

$$I(X;Y) = H(Y) - H(Y|X) = H(X) - H(X|Y).$$

4. The system of claim 1, wherein $I^{\mathbb{P}}$ is optimized using a mutual information neural estimation (MINE) lower bound in accordance with a relation:

$$I^{\mathbb{P}}(X;Y) \geq I_{\theta,\omega}^{\mathbb{P}}(X,Y) : I_{\theta,\omega}^{\mathbb{P}}(X,Y) = E_{\mathbb{P}_{XY}}(T_\zeta(X,Y)) - \log E_{\mathbb{P}_X \otimes \mathbb{P}_Y}(e^{T_\zeta(X,Y)});$$

wherein $T_\zeta(X,Y)$ is a parametrized test function adapted to distinguish samples of a joint distribution from those from a product of marginals; and wherein the parametrized test function is provided in accordance with $T_\zeta(X,Y) = T_{\theta,\omega}(X,Y)$.

5. The system of claim 4, wherein the processor is configured to compose an intermediary hidden layer representation $\phi_\omega(\cdot)$ of the first neural network with a discriminator $D_\theta : \Phi \to \mathbb{R}$; and
   wherein the parametrized test function is provided in accordance with $T_{\theta,\omega}(X,Y) = D_\theta(\phi_\omega(X), (\phi_\omega(Y))$.

6. The system of claim 4, wherein the relation $$I^{\mathbb{P}}(X;Y) \geq I_{\theta,\omega}^{\mathbb{P}}(X,Y) : I_{\theta,\omega}^{\mathbb{P}}(X,Y) = E_{\mathbb{P}_{XY}}(T_\zeta(X,Y)) - \log E_{\mathbb{P}_X \otimes \mathbb{P}_Y}(e^{T_\zeta(X,Y)})$$

is optimized using noise contrastive estimation to turning convert the relation into a binary classification problem.

7. The system of claim 1, wherein $I_{\theta,\omega}^Q$ is directly optimized using a reward augmented maximum likelihood approach (RAML) whereby a reverse direction of KL divergence is optimized compared to an entropy-regularized policy gradient RL objective.

8. The system of claim 7, wherein the reward augmented maximum likelihood approach includes utilizing an importance sampling approach whereby a geometric distribution based at the index of Y* as a proposal distribution is used, where Y* is a token following X in a corpus of data.

9. The system of claim 1, wherein the trained first neural network is utilized to receive new input data sets and to generate output data sets by processing the new input data sets through the adaptive interconnections of the one or more interconnected computing nodes of the first neural network.

10. The system of claim 9, wherein the new input data sets and the output data sets each include at least one of natural language text strings and structured query language (SQL) text tokens, and the output data sets are representative of a next token predicted based on a new input data set of the new input data sets.

11. A computer implemented method for training a first neural network representing data model Q maintained on one or more interconnected computing nodes having adaptive interconnections, the method comprising:
   initializing the first neural network by providing a discriminator neural network parametrized by $\theta$ for hidden features of the data model Q parametrized by $\omega$, the discriminator neural network observing pairs of segments or sequence in an input data set;
   conducting a next token prediction training process of the data model Q, the next token prediction training process adapted for learning to classify a correct next token from a randomly sampled token until a switching condition is satisfied to provide parameters $\theta$, $\omega$, the next token prediction training process establishing a lower bound of mutual information $I_{\theta,\omega}^{\mathbb{P}}$ between sampled elements in the series of elements from the data distribution P;
   establishing a lower bound of mutual information $I_{\theta,\omega}^Q$ in the data model Q based on the parameters $\theta$, $\omega$;
   training the discriminator neural network to optimize $I_{\theta,\omega}^{\mathbb{P}}$; and
   after the discriminator neural network has converged, incorporating $I_{\theta,\omega}^Q$ as a reward for training the first neural network representing the data model Q to optimize the mutual information in the data model Q between two random variables X and Y, $I^Q(X; Y)$, the training causing updates to the adaptive interconnections of the one or more interconnected computing nodes of the first neural network.

12. The method of claim 11, wherein mutual information I(X; Y) between two random variables X and Y is defined as a Kullback-Leibler (KL) divergence between a joint $\mathbb{P}_{XY}$ and a product of marginal distributions $\mathbb{P}_X \otimes \mathbb{P}_Y$ of two random variables established by the relation:

$$I(X;Y)=KL(\mathbb{P}_{XY} \| \mathbb{P}_X \otimes \mathbb{P}_Y).$$

13. The method of claim 11, wherein the mutual information I(X; Y) between two random variables X and Y is defined as the difference between entropy and conditional entropy:

$$I(X;Y)=H(Y)-H(Y|X)=H(X)-H(X|Y).$$

14. The method of claim 11, wherein $I^\mathbb{P}$ is optimized using a mutual information neural estimation (MINE) lower bound in accordance with a relation:

$$I^\mathbb{P}(X;Y) \geq I^\mathbb{P}_{\theta,\omega}(X,Y) : I^\mathbb{P}_{\theta,\omega}(X,Y) = E_{\mathbb{P}_{XY}}(T_\xi(X,Y)) - \log E_{\mathbb{P}_X \otimes \mathbb{P}_Y}(e^{T_\xi(X,Y)});$$

wherein $T_\xi(X,Y)$ is a parametrized test function adapted to distinguish samples of a joint distribution from those from a product of marginals; and wherein the parametrized test function is provided in accordance with $T_\xi(X,Y)=T_{\theta,\omega}(X,Y)$.

15. The method of claim 14, wherein the processor is configured to compose an intermediary hidden layer representation $\phi_\omega(\cdot)$ of the first neural network with a discriminator $D_\theta:\Phi \to \mathbb{R}$; and wherein the parametrized test function is provided in accordance with $T_{\theta,\omega}(X,Y)=D_\theta(\phi_\omega(X), \phi_\omega(Y))$.

16. The method of claim 14, wherein the relation $$I^\mathbb{P}(X;Y) \geq I^\mathbb{P}_{\theta,\omega}(X,Y) : I^\mathbb{P}_{\theta,\omega}(X,Y) = E_{\mathbb{P}_{XY}}(T_\xi(X,Y))-\log E_{\mathbb{P}_X \otimes \mathbb{P}_Y}(e^{T_\xi(X,Y)});$$

is optimized using noise contrastive estimation to turning convert the relation into a binary classification problem.

17. The method of claim 11, wherein $I^Q_{\theta,\omega}$ is directly optimized using a reward augmented maximum likelihood approach (RAML) whereby a reverse direction of KL divergence is optimized compared to an entropy-regularized policy gradient RL objective.

18. The method of claim 17, wherein the reward augmented maximum likelihood approach includes utilizing an importance sampling approach whereby a geometric distribution based at the index of Y* as a proposal distribution is used, where Y* is a token following X in a corpus of data.

19. The method of claim 11, wherein the trained first neural network is utilized to receive new input data sets and to generate output data sets by processing the new input data sets through the adaptive interconnections of the one or more interconnected computing nodes of the first neural network.

20. A non-transitory computer readable medium, storing machine interpretable instructions, which when executed by a processor, cause the processor to perform a computer implemented method for training a first neural network representing data model Q maintained on one or more interconnected computing nodes having adaptive interconnections, the method comprising:

initializing the first neural network by providing a discriminator neural network parametrized by θ for hidden features of the data model Q parametrized by w, the discriminator neural network observing pairs of segments or sequence in an input data set;

conducting a next token prediction training process of the data model Q, the next token prediction training process adapted for learning to classify a correct next token from a randomly sampled token until a switching condition is satisfied to provide parameters θ, ω, the next token prediction training process establishing a lower bound of mutual information $I^\mathbb{P}_{\theta,\omega}$ between sampled elements in the series of elements from the data distribution P;

establishing a lower bound of mutual information $I_{\theta,\omega}{}^Q$ in the data model Q based on the parameters θ, ω;

training the discriminator neural network to optimize $I^\mathbb{P}_{\theta,\omega}$; and after the discriminator neural network has converged, incorporating $I_{\theta,\omega}{}^Q$ as a reward for training the first neural network representing the data model Q to optimize the mutual information in the data model Q between two random variables X and Y, $I^Q(X; Y)$, the training causing updates to the adaptive interconnections of the one or more interconnected computing nodes of the first neural network.

* * * * *

UNITED STATES PATENT AND TRADEMARK OFFICE
CERTIFICATE OF CORRECTION

PATENT NO. : 11,763,129 B2
APPLICATION NO. : 16/809267
DATED : September 19, 2023
INVENTOR(S) : Yanshuai Cao and Peng Xu It is certified that error appears in the above-identified patent and that said Letters Patent is hereby corrected as shown below:

In the Claims

Column 29, Lines 25-30 (Claim 15):
"15. The method of claim 14, wherein the processor is configured to compose an intermediary hidden layer representation $\phi_\omega(.)$ of the first neural network with a discriminator $D_\theta: \Phi \rightarrow \mathbb{R}$; and wherein the parametrized test function is provided in accordance with $T_{\theta,\omega}(X, Y) = D_\theta(\phi_\omega(X), \phi_\omega(Y))$."
should read:
-- 15. The method of claim 14, comprising composing an intermediary hidden layer representation $\phi_\omega(.)$ of the first neural network with a discriminator $D_\theta: \Phi \rightarrow \mathbb{R}$; and wherein the parametrized test function is provided in accordance with $T_{\theta,\omega}(X, Y) = D_\theta(\phi_\omega(X), \phi_\omega(Y))$. --

Column 29, Lines 31 to 37 (Claim 16):
"16. The method of claim 14, wherein the relation
$I^{\mathbb{P}}(X;Y) \geq I^{\mathbb{P}}_{\theta,\omega}(X,Y): I^{\mathbb{P}}_{\theta,\omega}(X,Y) = E_{\mathbb{P}_{XY}}(T_\zeta(X,Y)) - log E_{\mathbb{P}_X \otimes \mathbb{P}_Y}(e^{T_\zeta(X,Y)})$;
is optimized using noise contrastive estimation to turning convert the relation into a binary classification problem."
Should read:
-- 16. The method of claim 14, wherein the relation
$I^{\mathbb{P}}(X;Y) \geq I^{\mathbb{P}}_{\theta,\omega}(X,Y): I^{\mathbb{P}}_{\theta,\omega}(X,Y) = E_{\mathbb{P}_{XY}}(T_\zeta(X,Y)) - log E_{\mathbb{P}_X \otimes \mathbb{P}_Y}(e^{T_\zeta(X,Y)})$
is optimized using noise contrastive estimation to convert the relation into a binary classification problem. --

Signed and Sealed this
Thirtieth Day of April, 2024

Katherine Kelly Vidal
*Director of the United States Patent and Trademark Office*